(12) United States Patent
Goel et al.

(10) Patent No.: US 7,889,361 B2
(45) Date of Patent: Feb. 15, 2011

(54) METHODS AND APPARATUS FOR ADAPTIVE IMPOSITION TEMPLATES

(75) Inventors: Puneet Goel, Union City, CA (US); Vivek Tandon, Sunnyvale, CA (US); Chueh Cheng Yang, San Francisco, CA (US)

(73) Assignee: Electronics for Imaging, Inc., Foster City, CA (US)

( * ) Notice: Subject to any disclaimer, the term of this patent is extended or adjusted under 35 U.S.C. 154(b) by 911 days.

(21) Appl. No.: 10/966,612

(22) Filed: Oct. 15, 2004

(65) Prior Publication Data

US 2006/0082793 A1 Apr. 20, 2006

(51) Int. Cl.
*G06K 15/00* (2006.01)
*G06F 3/12* (2006.01)

(52) U.S. Cl. .................................. 358/1.12; 358/1.15

(58) Field of Classification Search ................ 358/1.12, 358/1.2, 1.13, 1.18, 1.15, 1.6, 540, 452; 345/732, 345/744, 730
See application file for complete search history.

(56) References Cited

U.S. PATENT DOCUMENTS

| | | | | |
|---|---|---|---|---|
| 6,046,818 | A * | 4/2000 | Benson | 358/1.18 |
| 6,411,396 | B1 * | 6/2002 | Benson et al. | 358/1.18 |
| 6,839,149 | B2 * | 1/2005 | Herr | 358/1.15 |
| 7,163,269 | B2 * | 1/2007 | Levine et al. | 347/14 |
| 7,278,094 | B1 * | 10/2007 | Dreyer et al. | 715/234 |
| 2003/0007167 | A1 * | 1/2003 | Catt et al. | 358/1.12 |

FOREIGN PATENT DOCUMENTS

| | | | |
|---|---|---|---|
| EP | 0330343 | | 8/1989 |
| EP | 0 887 746 | * | 5/1998 |
| EP | 0887746 A2 | | 12/1998 |
| EP | 887746 A2 | * | 12/1998 |
| EP | 1031916 A2 | | 8/2000 |
| EP | 1031916 A2 | * | 8/2000 |

OTHER PUBLICATIONS

PCT/US2005/036792 Int'l Search Report & Written Opinion in Related WO Case, Nov. 7, 2006, Goel et al.

* cited by examiner

*Primary Examiner*—Edward L Coles
*Assistant Examiner*—Neil R McLean
(74) *Attorney, Agent, or Firm*—Glenn Patent Group; Michael A. Glenn

(57) ABSTRACT

Methods and apparatus are provided for receiving a print file having an actual page size, and a nominal imposition template specifying a nominal page size, and generating an imposition flat for printing. If the actual page size matches the nominal page size, the nominal imposition template is applied to the print file without change. If, however, the actual page size differs from the nominal page size, the nominal imposition template is automatically modified based on the actual page size, and then the modified imposition template is applied to the print file to create the imposition flat.

24 Claims, 21 Drawing Sheets

METHODS AND APPARATUS FOR ADAPTIVE IMPOSITION TEMPLATES

BACKGROUND

This invention relates to methods and apparatus for printing. More particularly, this invention relates to methods and apparatus for formatting multi-page documents for printing.

A print shop, such as a commercial printer or corporate printing department, typically prints multiple pages of a multi-page document on one or more press sheets, which may then be assembled, folded, cut and bound to form a final document. The specific operations performed on the printed press sheets (e.g., how the press sheets will be folded and cut, and the type of binding that will be used) are commonly called finishing operations. Prior to printing, a process called imposition typically is performed to determine the layout of the individual document pages on the press sheets. The imposition layout, often called the imposition flat, is determined based on the size of the press sheets, the desired finished size of the document and the various finishing operations that will be performed on the printed sheets.

An exemplary imposition flat for a two-page document is illustrated in FIG. 1. Exemplary imposition flat 10 includes press sheet 12 and pages 14a and 14b of the desired document. Press sheet 12 may be a 20"×15" sheet of paper, and pages 14a and 14b each may have a finished size of 8.5"×11". Imposition flat 10 also may include various alignment and identification marks, such as bleed marks 16, trim marks 18 and sheet registration marks 20. The specific locations on press sheet 12 of pages 14a and 14b, bleed marks 16, trim marks 18 and sheet registration marks 20 typically are determined based on the size of press sheet 12, the finished size of pages 14a and 14b, and specific finishing operations to be performed on the printed sheets.

An imposition flat, such as exemplary imposition flat 10, may be created manually by a person familiar with the operation of the equipment that will be used to print and finish the print job. More commonly, however, imposition flats are generated using imposition software programs, such as Fiery® DocBuilder Pro™ software by Electronics for Imaging, Foster City, Calif., U.S.A. An imposition software program may operate on a personal computer, laptop computer, computer workstation, print server, or other similar computer device. After a user provides the imposition software with page data for the desired output pages, and specifies the sheet size, finished output size and desired finishing operations, the imposition software generates an imposition flat, such as imposition flat 10.

For commonly recurring page layouts and finishing operations, many imposition software programs allow a user to create imposition templates, which are electronic representations of imposition page layouts, but without actual page data. The imposition templates subsequently may be applied to a print file containing the actual page data to create an imposition flat. In particular, a user typically submits a print file to the imposition software, selects a desired imposition template from a database of predefined templates, and the imposition software then generates the imposition flat that may be used to print the document.

An exemplary imposition template is illustrated in FIG. 2. Exemplary imposition template 20 specifies the size of press sheet 22 and the finished size of pages 24. In addition, imposition template 20 may include bleed marks 28a, trim marks 28b and sheet registration marks 28c (collectively referred to herein as "mark objects" 28), binding edges 30, and the locations of such objects on sheet 22. The locations of pages 24, mark objects 28 and binding edges 30 typically are specified in terms of two-dimensional coordinates, such as (x,y) coordinates. Once imposition template 20 has been created, the locations of pages 24, mark objects 28 and binding edges 30 typically are fixed.

In numerous instances, a print shop receives a new print job that has a finished page size that does not correspond exactly to the finished page size specified in a preexisting imposition template. For example, a print shop may have preexisting imposition template 20 designed for letter size (8.5"×11") pages, but may receive a new print job having custom page sizes (e.g., 8"×12"). Alternatively, a print shop may have a preexisting imposition template that matches the finished page size of the new print job, but the template specifies a press sheet size that may only be used on one piece of equipment in the print shop. If the specified piece of equipment suddenly goes down for repair, the print shop may not have other print equipment that may be immediately used to complete the new print job. For example, although the print shop may have other print equipment that uses an alternative sheet size that may accommodate the print job, the preexisting templates for that sheet size may not match the print job's finished page size.

In both instances, the print shop typically must create an entirely new imposition template for the new print job. To do so, the print shop may start from scratch, and use an imposition software program to create the template. This may be a very time-consuming process, however, and may cause a delay in printing the print job. In particular, if the print job is a rush job, the time required to generate the custom imposition template may cause the print shop to miss a required deadline for completing the job. Also, if the operator is inexperienced in template creation, the newly created imposition template may include numerous errors that further delay job completion and increase the total job cost.

Alternatively, rather than creating a new imposition template from scratch, the print operator may attempt to manually edit a preexisting template to accommodate the new print job. For example, the imposition software program may permit a user to import a preexisting imposition template, and then manually modify the locations of one or more of pages 24, bleed marks 28 or trim marks 30 based on the new page size. If the preexisting imposition template includes a large number of pages per sheet, however, (e.g., 16 pages), this may require a substantial amount of time, and may be prone to operator error, resulting in delay and added cost.

Further, it may be undesirable to continually create new imposition templates for every new print job. Indeed, the proliferation of imposition templates often creates an unwieldy data management problem for many print shops. In particular, if a print shop employs numerous print operators, it is not uncommon for each print operator to create their own personal set of imposition templates, named according to the operator's individual naming convention. In a large print shop that employs a large number of print operators, the print shop may have a database of a very large number of imposition templates. As a result, when a print operator attempts to locate a specific imposition template for a particular print job, the operator may waste a considerable amount of time searching the database to locate the correct template.

In view of the foregoing, it would be desirable to provide methods and apparatus to allow a preexisting imposition template to be used with a document having a finished page size different from the finished page size specified in the preexisting template.

It further would be desirable to provide methods and apparatus to automatically modify a preexisting imposition template for use with a document having a finished page size different from the finished page size specified in the preexisting template.

It additionally would be desirable to provide methods and apparatus to reduce the number of imposition templates that must be created and maintained for printing print jobs having varying finished page sizes.

SUMMARY

In view of the foregoing, it is an object of this invention to provide methods and apparatus to allow a preexisting imposition template to be used with a document having a finished page size different from the finished page size specified in the preexisting template.

It further is an object of this invention to provide methods and apparatus to automatically modify a preexisting imposition template for use with a document having a finished page size different from the finished page size specified in the preexisting template.

It additionally is an object of this invention to provide methods and apparatus to reduce the number of imposition templates that must be created and maintained for printing print jobs having varying finished page sizes.

These and other objects of this invention are accomplished by providing imposition systems and methods that receive a print file having an actual page size, and a nominal imposition template specifying a nominal page size, and generate an imposition flat for printing. In particular, imposition systems and methods in accordance with this invention apply the nominal imposition template to the print file without change if the actual page size matches the nominal page size. If, however, the actual page size differs from the nominal page size, imposition systems and methods in accordance with this invention automatically modify the nominal imposition template based on the actual page size, and then apply the modified imposition template to the print file to create the imposition flat.

BRIEF DESCRIPTION OF THE DRAWINGS

The above-mentioned objects and features of the present invention can be more clearly understood from the following detailed description considered in conjunction with the following drawings, in which the same reference numerals denote the same elements throughout, and in which.

DETAILED DESCRIPTION

Figure 1:
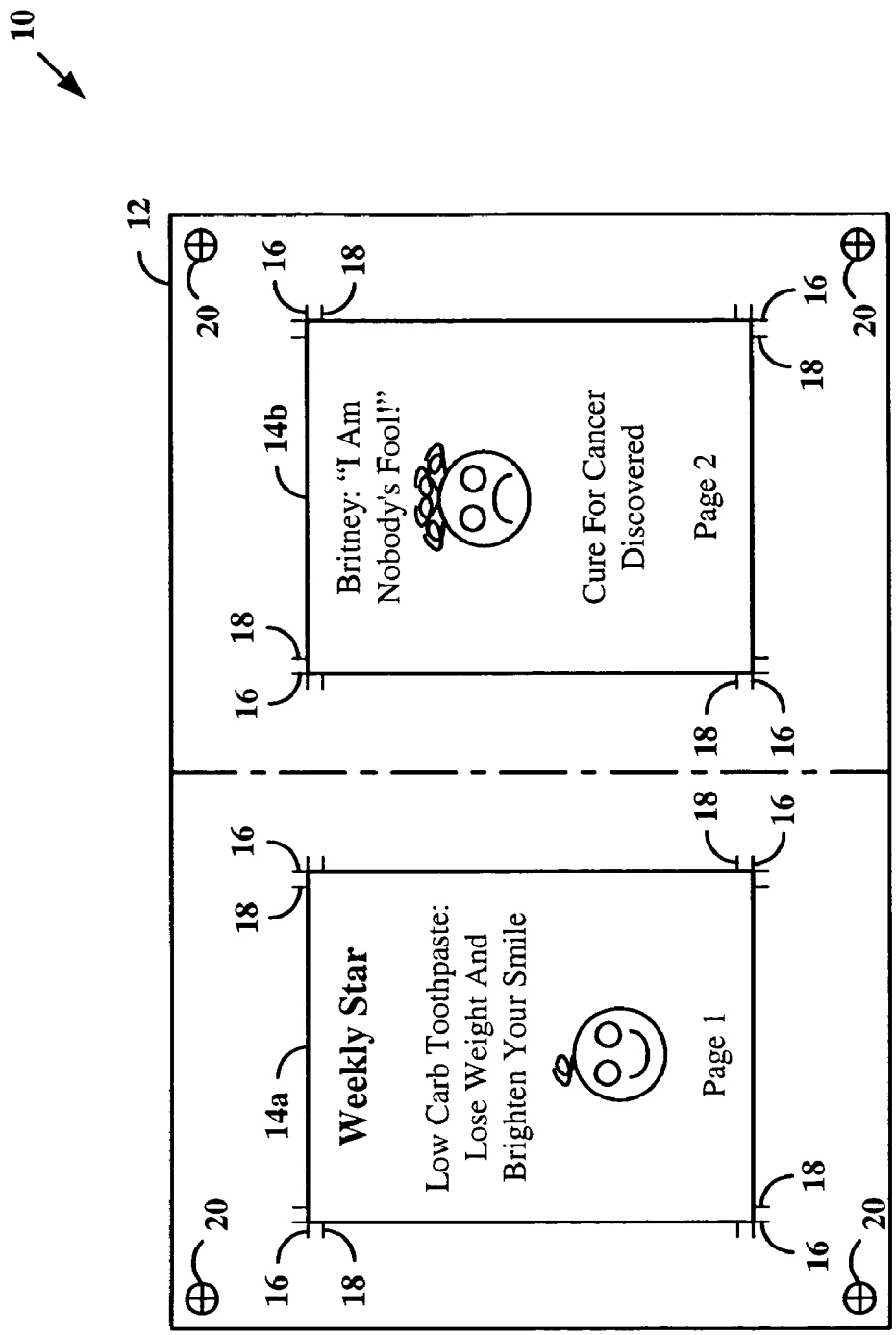
FIG. 1 is a diagram of a previously known imposition flat.
Figure 2:
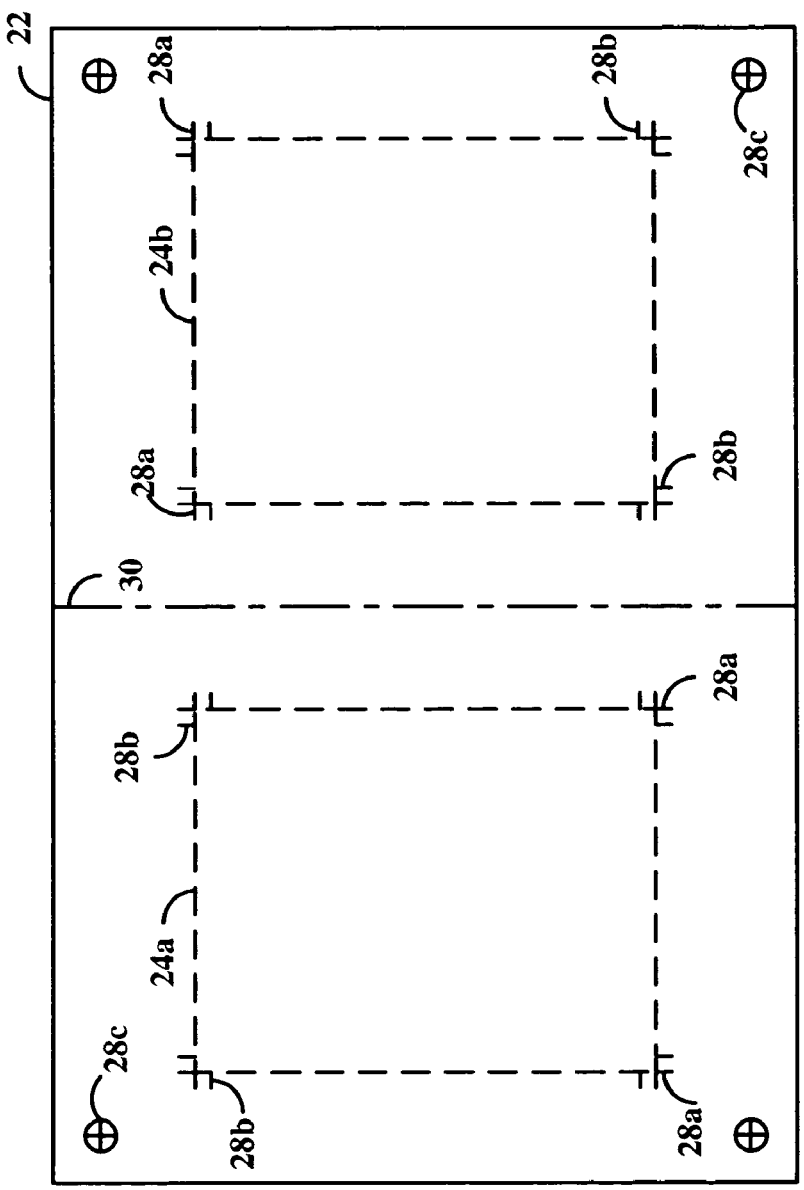
FIG. 2 is a diagram of a previously known imposition template.
Figure 3:
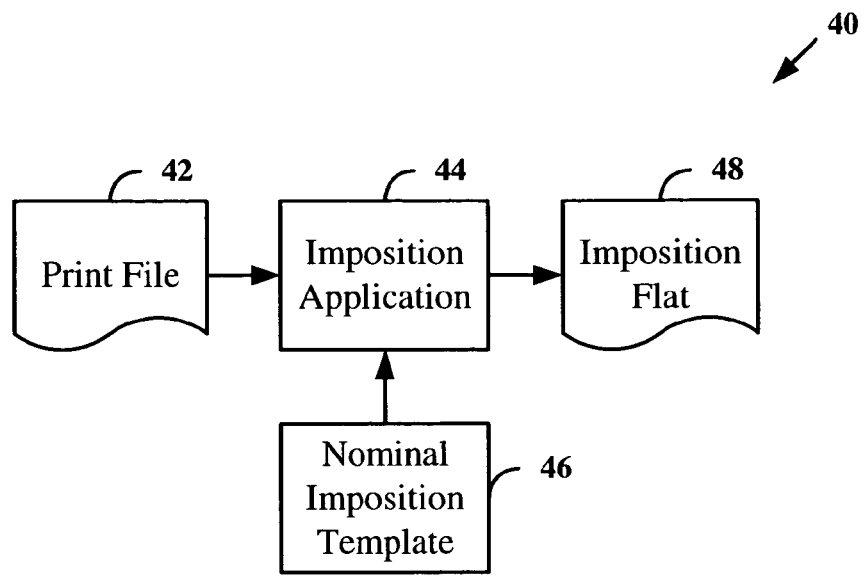
FIG. 3 is a block diagram of an exemplary imposition system in accordance with this invention.

Referring now to FIG. 3, an exemplary imposition system in accordance with this invention is described. Exemplary imposition system 40 includes imposition application 44, which receives print file 42 and nominal imposition template 46, and generates imposition flat 48 for printing. Imposition application 44 may be hardware and/or software that implements imposition processing in accordance with this invention, as described in more detail below. Print file 42 may be an electronic file that describes a print job in a page description language, such as portable document format ("PDF"), PostScript, page command language ("PCL") or other similar page description language. Print file 42 includes a parameter that specifies finished page size (referred to herein as "actual page size" or "$PS_A$"). For example, if print file 42 includes letter-size pages, actual page size $PS_A$=8.5"×11". Alternatively, if print file 42 includes custom-size pages (e.g., 8"×12"), actual page size $PS_A$=8"×12". Persons of ordinary skill in the art will understand that other actual page sizes also may be used.

Figure 4:
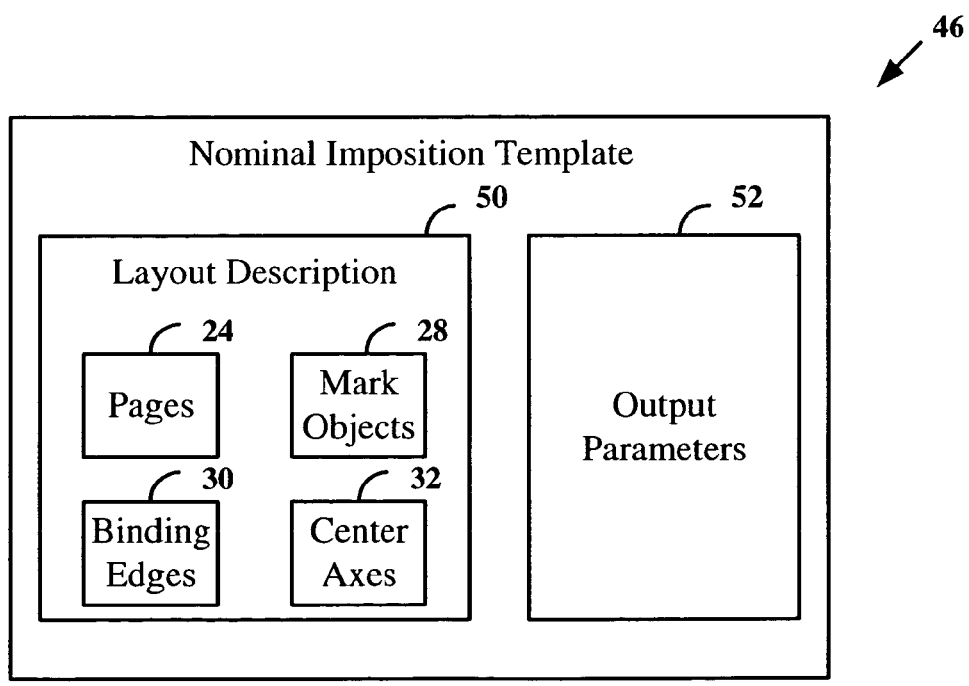
FIG. 4 is a diagram of an exemplary nominal imposition template in accordance with this invention.

Referring now to FIG. 4, an exemplary nominal imposition template 46 for use with imposition system 40 is described. In particular, nominal imposition template 46 may include a nominal layout description 50 and output parameters 52. Nominal layout description 50 includes nominal pages 24 and mark objects 28, and also may include binding edges 30 or center axes 32, and their respective locations. Output parameters 52 include information describing various parameters used during printing and finishing of the print job. For example, output parameters 52 may include sheet size (e.g., 25"×19"), finished page size (referred to herein as "nominal page size" or "$PS_N$") (e.g., 8.5"×11"), the number of rows and columns per sheet (e.g., 2 rows and 4 columns), binding style (e.g, perfect, saddle stitch) and work style (e.g., sheetwise, work and turn, work and tumble). Persons of ordinary skill in the art will understand that different or additional printing and finishing parameters may be included in output parameters 52.

Figure 5A:
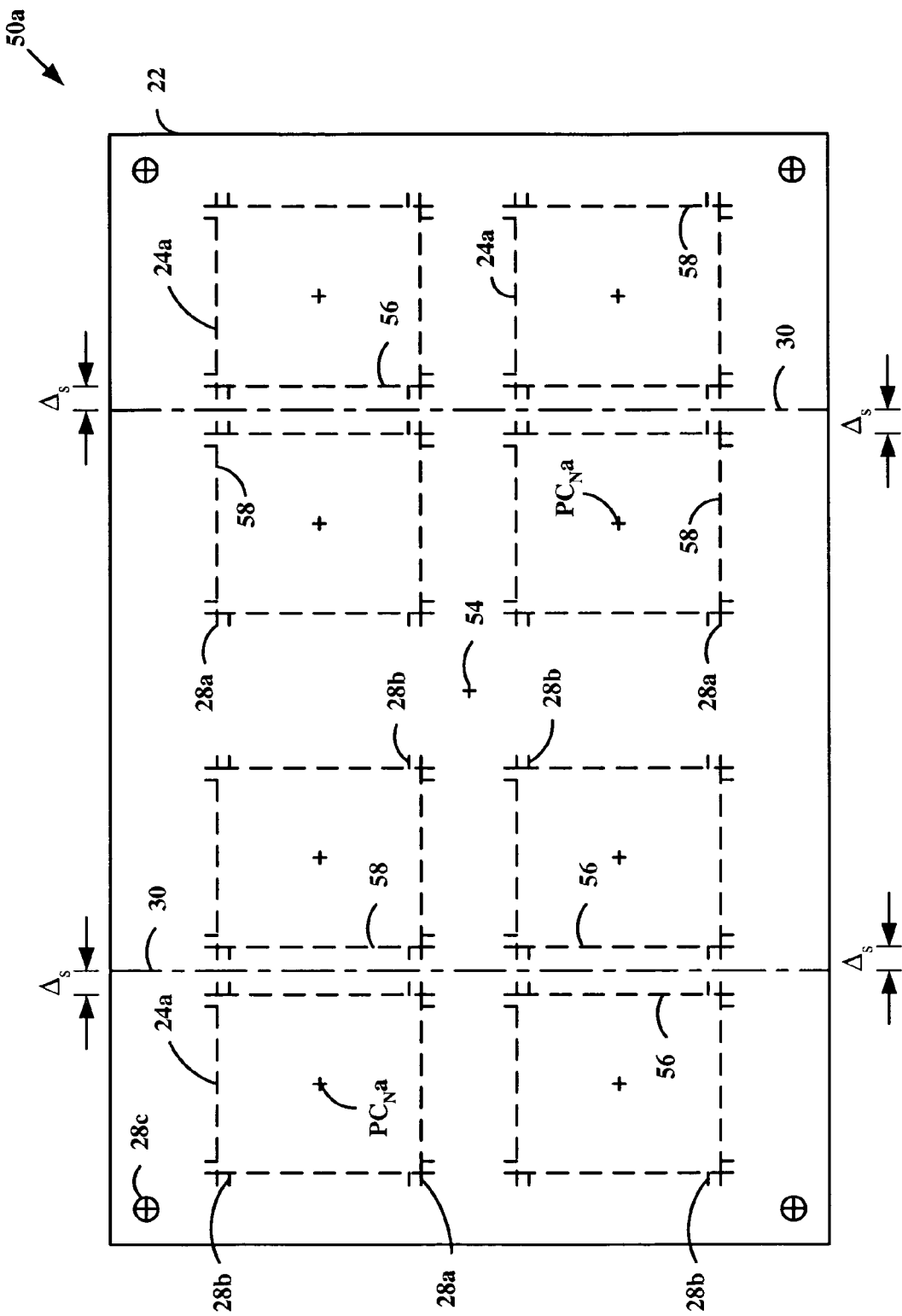
FIG. 5A is a diagram of an exemplary imposition layout description in accordance with this invention.
Figure 5B:
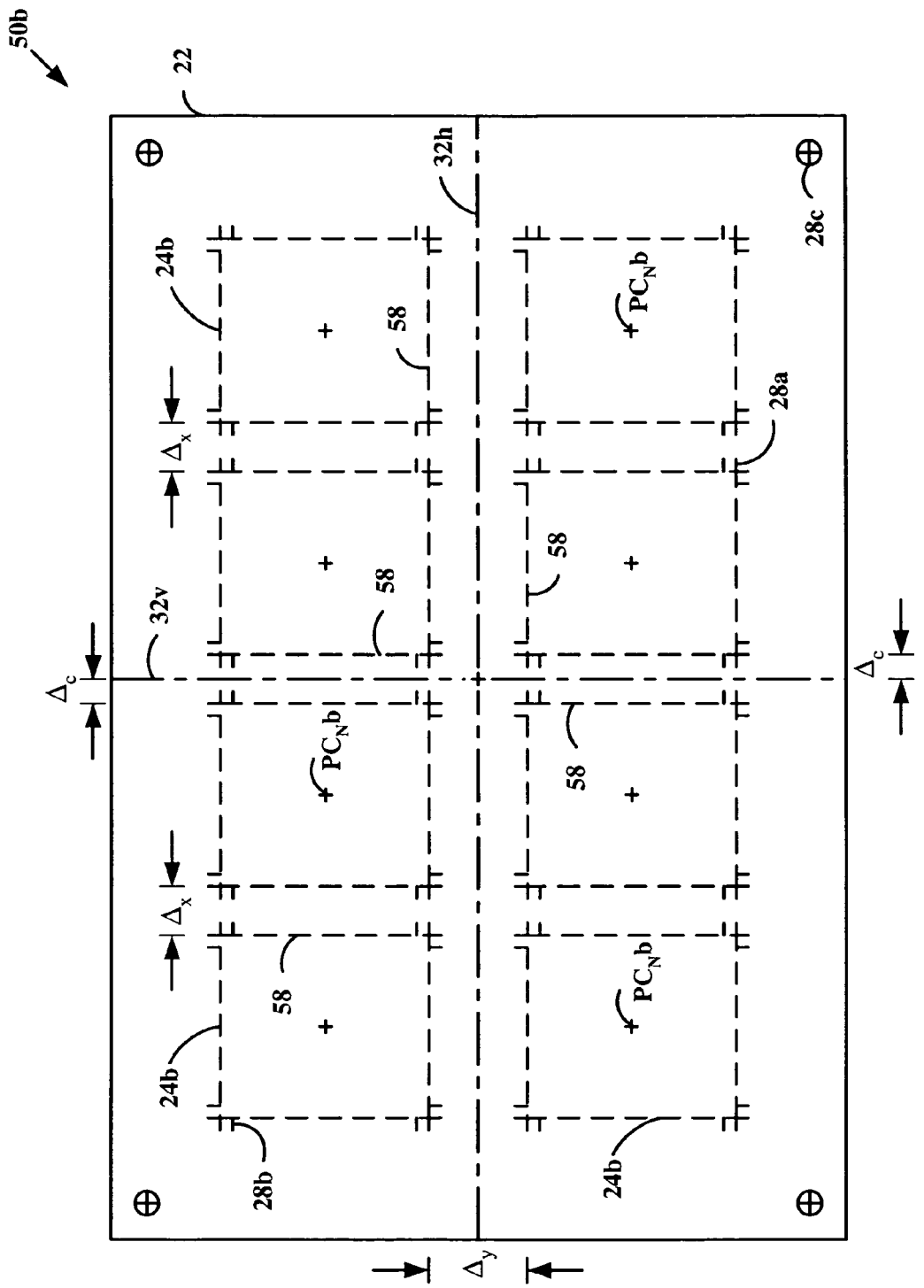
FIG. 5B is a diagram of another exemplary imposition layout description in accordance with this invention.

Referring now to FIGS. 5A and 5B, exemplary nominal layout descriptions 50a and 50b, respectively, for use in nominal imposition template 46 are described. In particular, nominal layout description 50a illustrates an exemplary layout for a document that uses book binding, and nominal layout description 50*b* illustrates an exemplary layout for a document that uses a binding style other than book binding (e.g., gangup binding). Nominal layout description 50*a* includes binding edges 30, and layout description 50*b* includes vertical and horizontal center axes 32*v* and 32*h*, respectively.

Each nominal page 24 may include associated mark objects 28, such as bleed marks 28*a* and trim marks 28*b*, a corresponding page location reference, such as a nominal page center ("$PC_N$"), and four page edges 58 (top, bottom, left and right). Each nominal page 24*a* in nominal layout description 50*a* also includes a page spine 56 that indicates the page edge 58 that will be bound during finishing. The separation between each page spine 56 and an adjacent binding edge 30 is designated as $\Delta_s$. In nominal layout description 50*b*, the separation between vertical center axis 32*v* and an adjacent parallel page edge 58 is designated as $\Delta_c$, the horizontal separation between all other adjacent vertical page edges 58 is designated as $\Delta_x$, and the vertical separation between all other adjacent horizontal page edges 58 is designated as $\Delta_y$.

For each page 24*a* and 24*b* in exemplary nominal layout descriptions 50*a* and 50*b*, respectively, the locations of associated bleed marks 28*a* and trim marks 28*b* depend on nominal page size $PS_N$. In this regard, bleed marks 28*a* and trim marks 28*b* are referred to herein as "page-dependent marks." In contrast, the locations of registration marks 28*c* are not page-dependent, because their locations do not depend on page size. In accordance with this invention, imposition application 44 may be used to automatically modify imposition template 46 to accommodate a print file 42 whose actual page size $PS_A$ does not match the nominal page size $PS_N$ specified in nominal imposition template 46.

Figure 6:
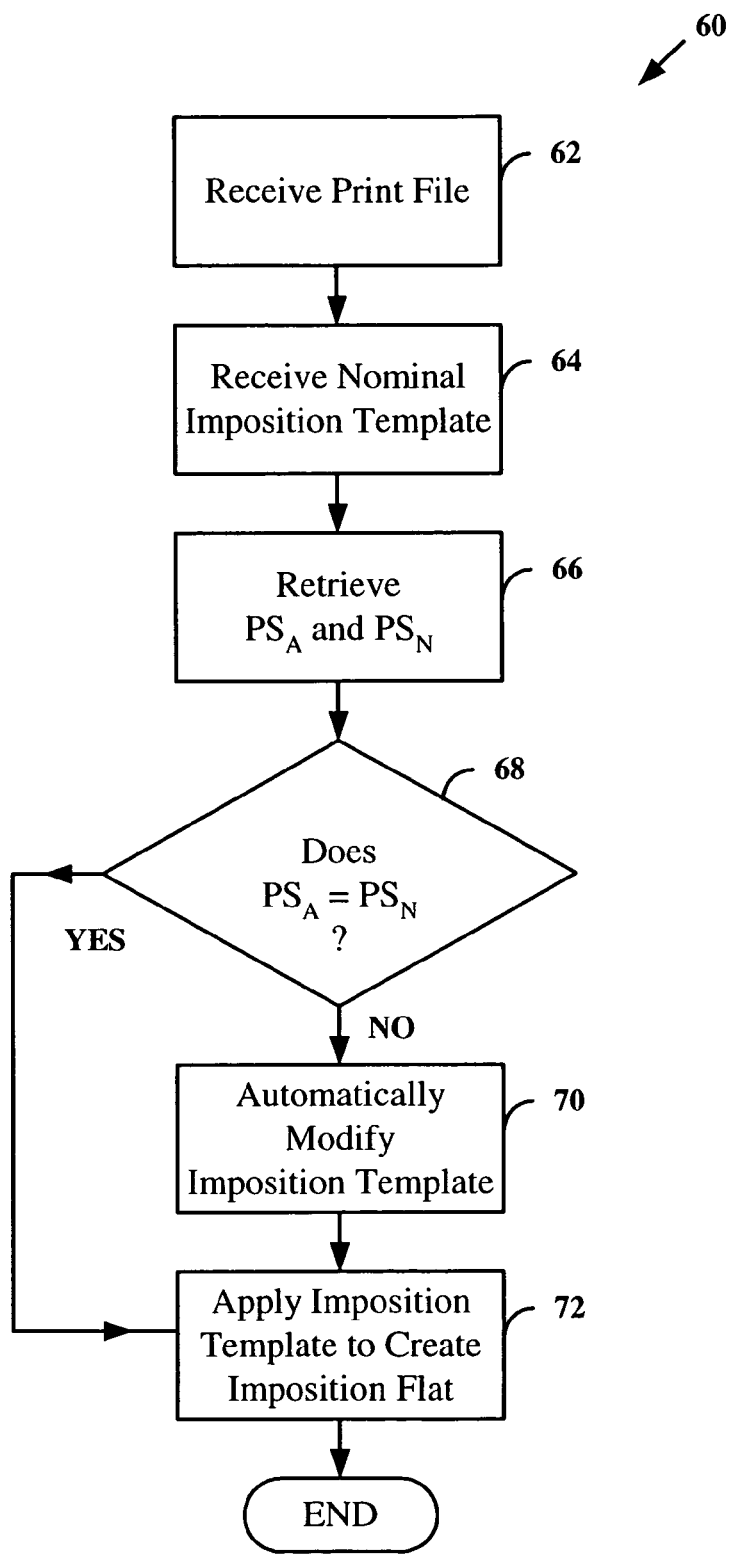
FIG. 6 is a flowchart of an exemplary imposition process in accordance with this invention.

Referring now to FIGS. 3 and 6, an exemplary imposition process 60 implemented by imposition application 44 is described. In particular, beginning at step 62, print file 42 is received. For example, a user may select print file 42 from a file directory via a graphical user interface (not shown) or other similar print file submission mechanism. Next, at step 64, nominal imposition template 46 is received. For example, a user may select nominal imposition template 46 from a directory of previously-created imposition templates. At step 66, actual page size $PS_A$ is retrieved from print file 42, and nominal page size $PS_N$ is retrieved from nominal imposition template 46. At step 68, actual page size $PS_A$ is compared to nominal page size $PS_N$. For example, the width and height of $PS_A$, referred to as $PS_A$(width) and $PS_A$(height), respectively, may be compared to the corresponding parameters of nominal page size $PS_N$, referred to as $PS_N$(width) and $PS_N$(height), respectively.

If actual page size $PS_A$ equals nominal page size $PS_N$ (i.e., if $PS_A$(width)=$PS_N$(width) and $PS_A$(height)=$PS_N$(height)), the process proceeds to step 72, and nominal imposition template 46 is applied to print file 42 without change to create imposition flat 48. If, however, actual page size $PS_A$ does not equal nominal page size $PS_N$ (e.g., if $PS_A$(width)≠$PS_N$(width) or $PS_A$(height)≠$PS_N$(height)), the process proceeds to step 70, wherein nominal imposition template 46 is automatically modified based on actual page size $PS_A$ to create modified imposition template 46'. Modified imposition template 46' includes the same number of pages and mark objects as nominal imposition template 46, but the locations of actual pages 24' and associated page-dependent mark objects 28 are modified based on actual page size $PS_A$. Finally, at step 72, the modified imposition template 46' from step 70 is applied to print file 42 to create imposition flat 48.

Figure 7:
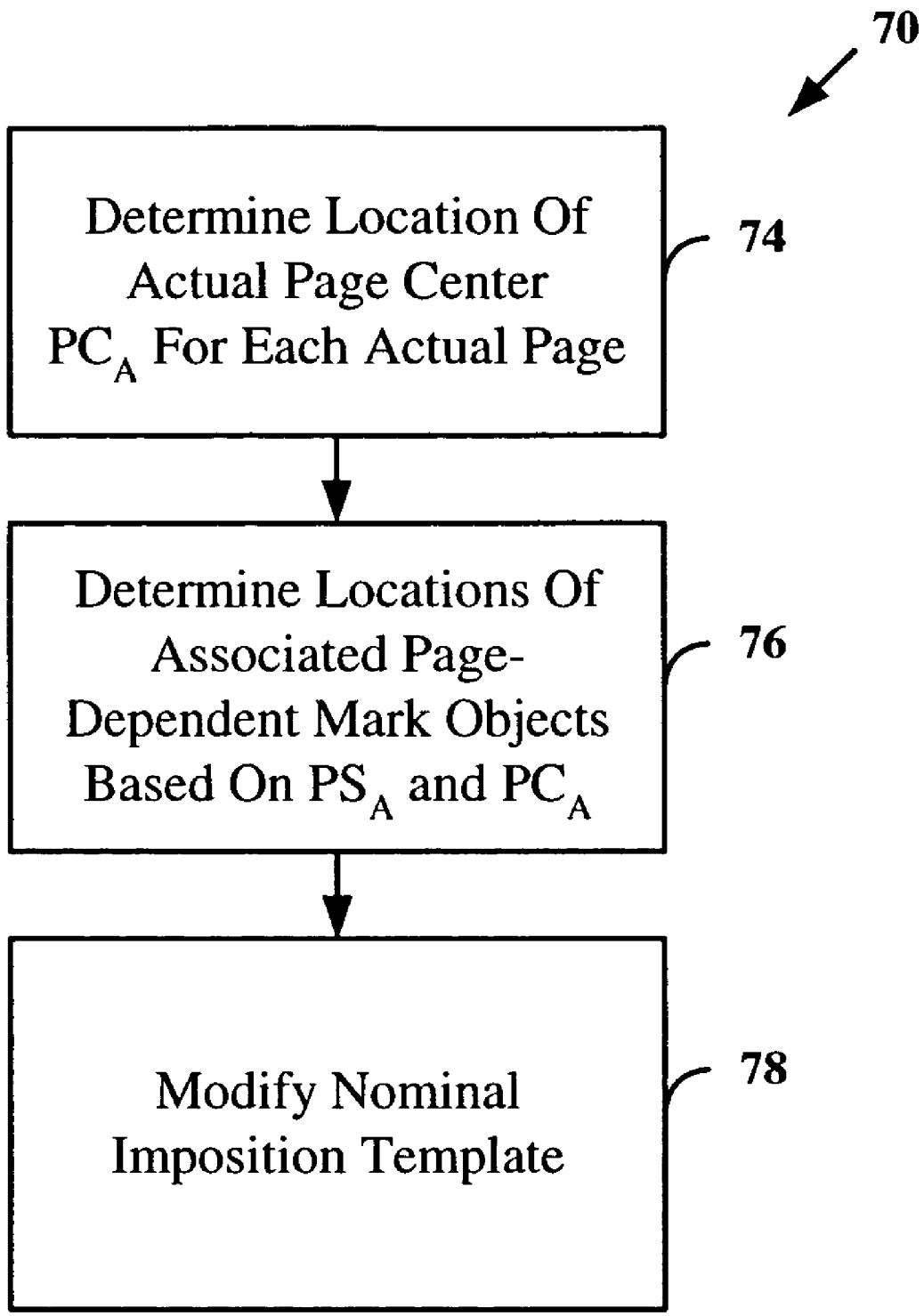
FIG. 7 is a flow diagram of an exemplary process for creating a modified imposition template in accordance with this invention.

Referring now to FIG. 7, an exemplary process 70 for automatically modifying nominal imposition template 46 is described. Beginning at step 74, the location of the actual page center ("$PC_A$") of each actual page 24' is determined. As described in more detail below, the determination of the location of each actual page center $PC_A$ depends on the binding style and finishing parameters specified in nominal imposition template 46, and the actual page size $PS_A$ specified in print file 42. Next, at step 76, for each actual page 24', the locations of the associated page-dependent mark objects 28 are determined based on the location of the corresponding actual page center $PC_A$ determined in step 74 and the actual page size $PS_A$. Finally, at step 78, nominal imposition template 46 is modified to position actual pages 24' and their associated page-dependent mark objects 28 at the locations determined in steps 74 and 76.

As previously mentioned, the determination of the actual page center $PC_A$ for each actual page 24' depends on the binding style and finishing parameters specified in nominal imposition template 46. In particular, if the specified binding style is book binding, a first process 74*a* may be used to determine the location of each actual page center $PC_A$. Alternatively, if the specified binding style is anything other than book binding (e.g., gangup), a second process 74*b* may be used to determine the location of each actual page center $PC_A$. Processes 74*a* and 74*b* each will be described in turn.

Figure 8A:
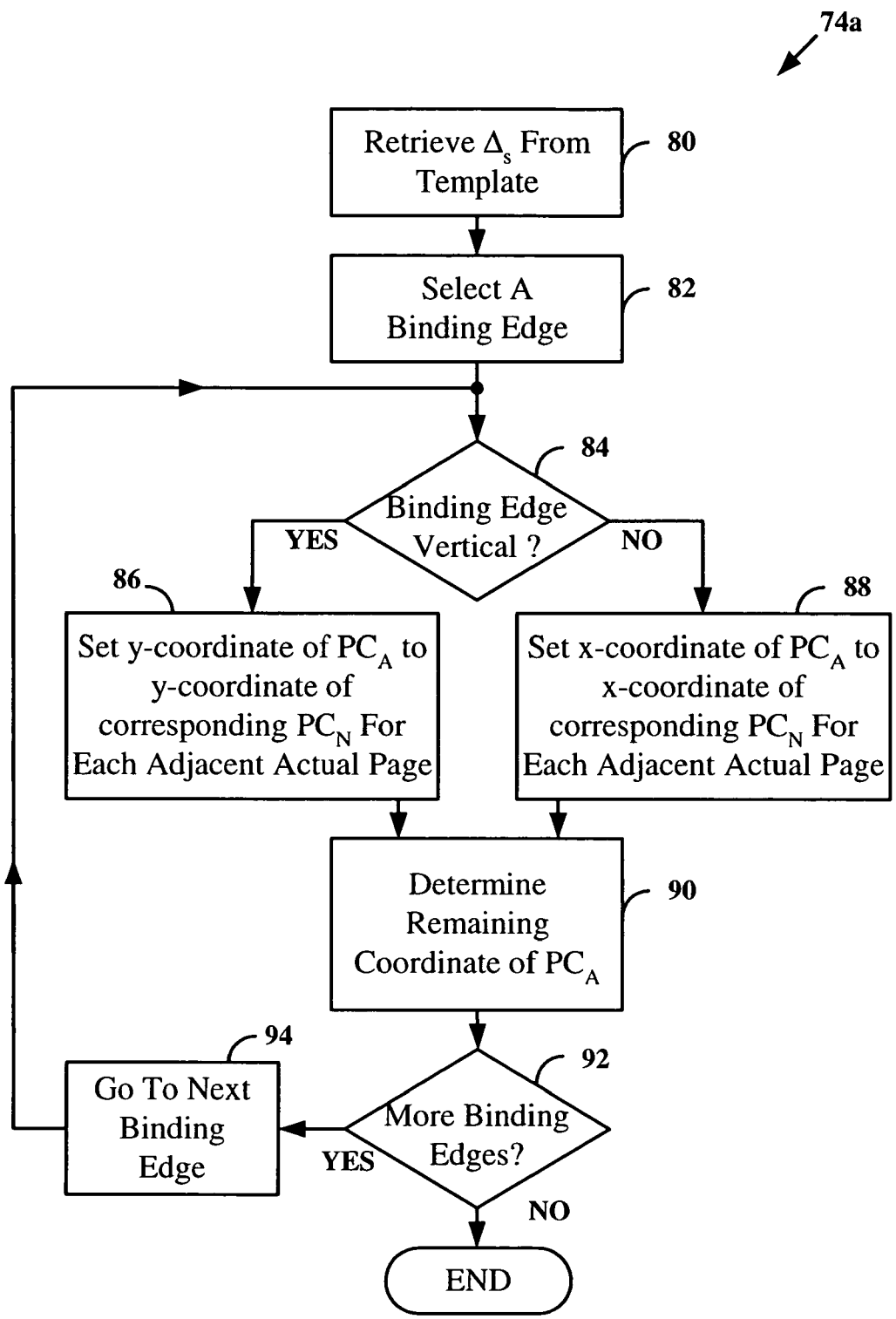
FIG. 8A is a flow diagram of an exemplary process for creating a modified imposition template in accordance with this invention for a book binding layout.
Figure 9A:
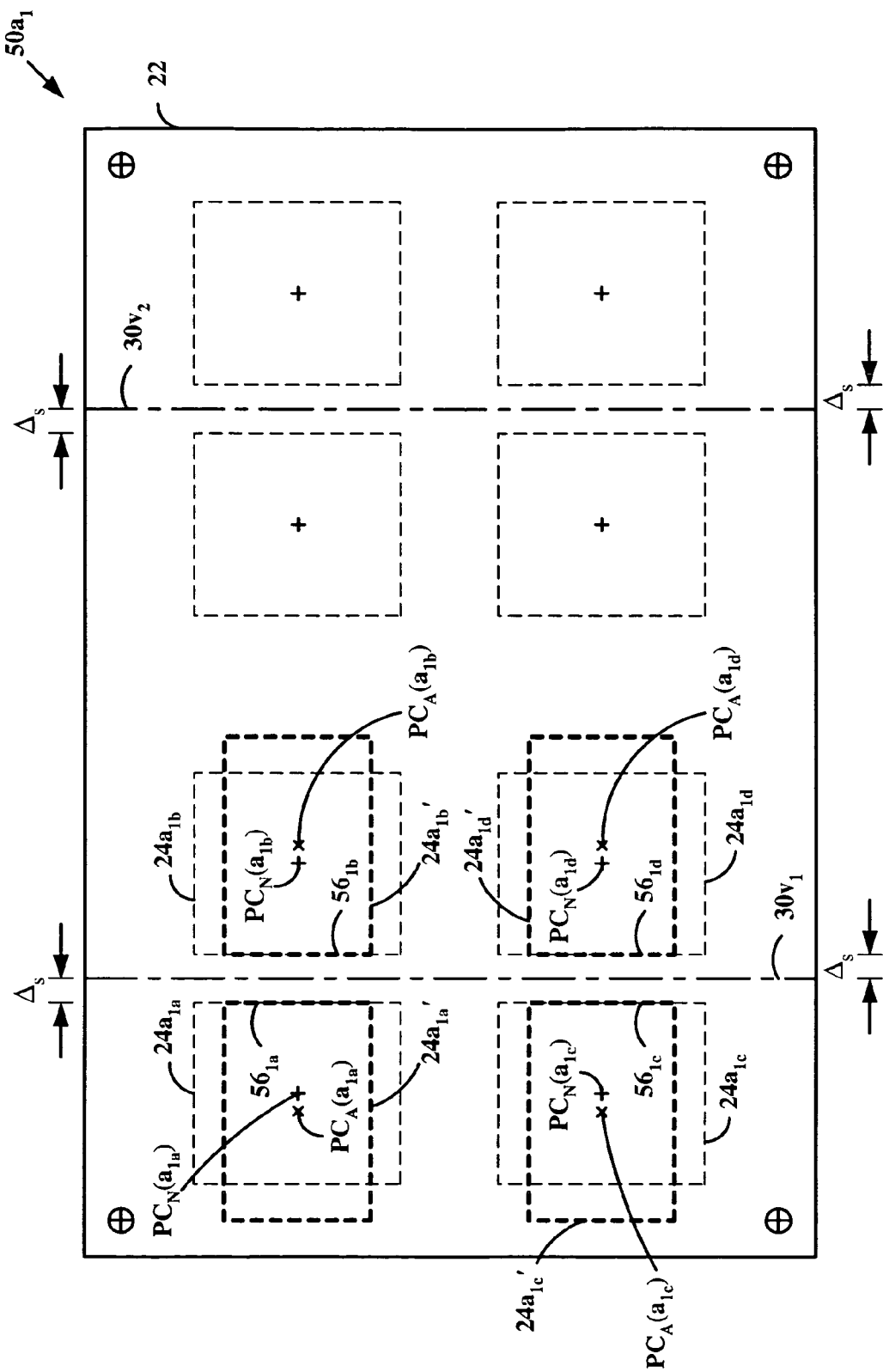
FIG. 9A is an exemplary imposition layout in accordance with this invention for a book binding template.
Figure 9B:
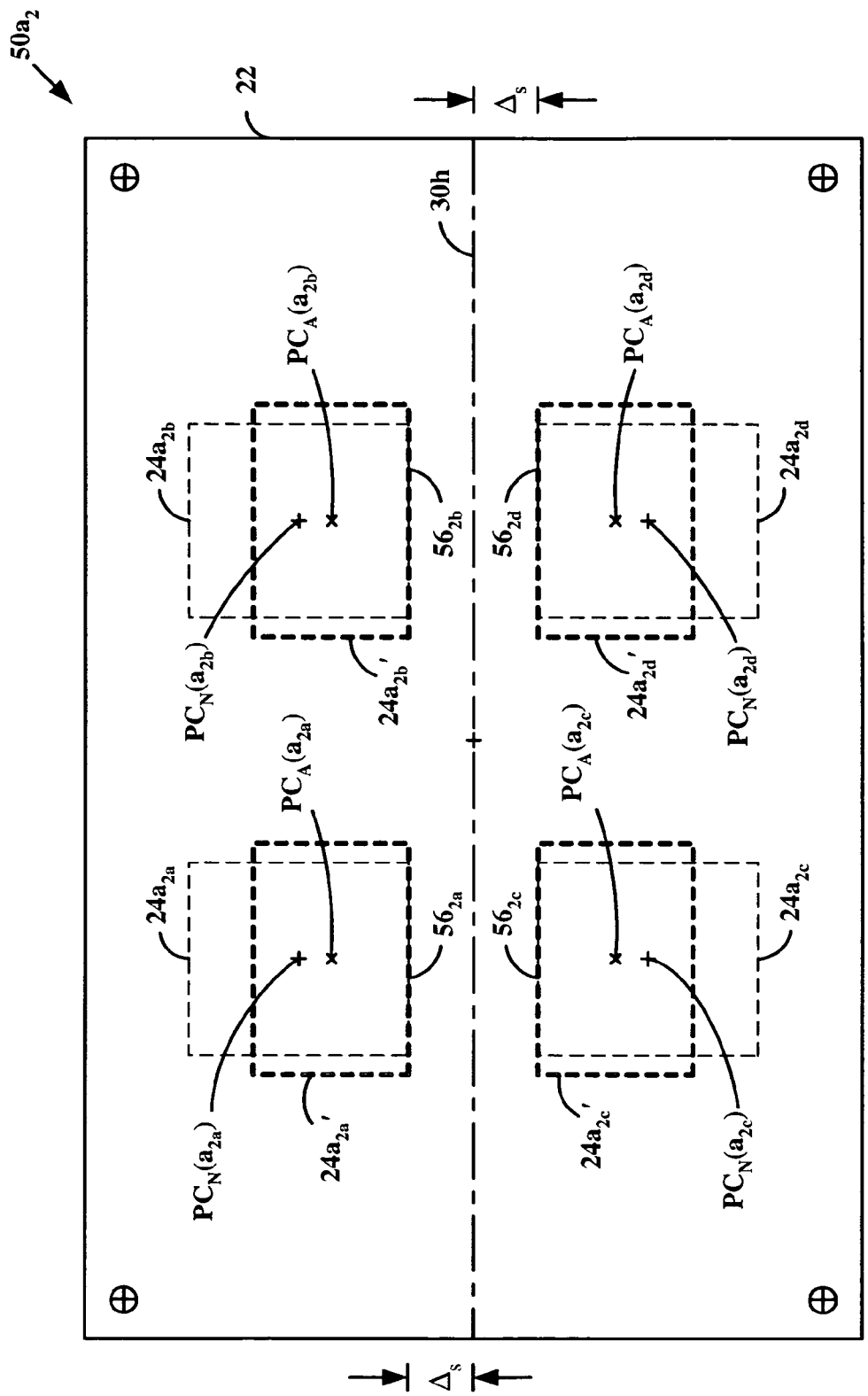
FIG. 9B is another exemplary imposition layout in accordance with this invention for a book binding template.

Referring now to FIGS. 8A and 9, an exemplary process 74*a* is described for determining the location of each actual page center $PC_A$ for a nominal imposition template 46 that specifies book binding. In particular, FIG. 9A illustrates an exemplary layout description $50a_1$ that includes vertical binding edges 30*v* and actual pages $24a_1$', and FIG. 9B illustrates an exemplary layout description $50a_2$ that includes horizontal binding edge 30*h* and actual pages $24a_2$'. For illustrative purposes, FIGS. 9A and 9B also show corresponding nominal pages 24*a* and 24*b*, respectively, and nominal page centers $PC_N$(a) and $PC_N$(b), respectively. For clarity, bleed marks 28*a* and trim marks 28*b* associated with pages 24*a* and 24*b* are not shown.

Referring again to FIG. 8A, beginning at step 80, the spine-binding edge separation $\Delta_s$ is retrieved from nominal imposition template 46. Next, at step 82, one of binding edges 30 is selected for processing. At step 84, a determination is made whether the selected binding edge 30 is vertical or horizontal. If the selected binding edge 30 is vertical, the process proceeds to step 86, wherein for each actual page 24*a*' adjacent to the selected binding edge 30*v*, the y-coordinate of the actual page center $PC_A$(a) is set to the y-coordinate of the corresponding nominal page center $PC_N$(a). If, however, the selected binding edge 30 is horizontal, the process proceeds to step 88, wherein for each actual page 24*a*' adjacent to the selected binding edge 30*h*, the x-coordinate of the actual page center $PC_A$(a) is set to the x-coordinate of the corresponding nominal page center $PC_N$(a).

Next, at step 90, for each actual page 24*a*', the remaining coordinate (i.e., the x-coordinate if step 86 was used, or the y-coordinate if step 88 was used) of the corresponding actual page center $PC_A$(a) is determined based on the location of the selected binding edge, the spine-binding edge separation $\Delta_s$ and the actual page size $PS_A$. In this regard, the spine 56 of each actual page 24*a*' is aligned to the spine 56 of the corresponding nominal page 24*a* to preserve spine-binding edge separation $\Delta_s$. At step 92, a determination is made whether modified layout description 50*a*' includes any more binding edges 30. If so, at step 94, a binding edge 30 is selected that has not yet been processed, and then the process returns to step 84 to process the new binding edge as described above. If, however, there are no additional binding edges 30, the process terminates.

Examples of the operation of steps 82-92 are now described using the exemplary layout description 50$a_1$ and 50$a_2$ illustrated in FIGS. 9A and 9B, respectively. In particular, referring now to FIGS. 8A and 9A, at step 82, one of binding edges 30$v_1$ and 30$v_2$ is selected. For example, binding edge 30$v_1$, which is surrounded by adjacent actual pages 24$a_{1a}$'-24$a_{1d}$', may be selected. At step 84, binding edge 30$v_1$ is identified as vertical, and therefore the process proceeds to step 86, wherein for each actual page 24$a_{1a}$'-24$a_{1d}$', the y-coordinate of the actual page center $PC_A(a_{1a})$-$PC_A(a_{1d})$, respectively, is set to the y-coordinate of the corresponding nominal page center $PC_N(a)$:

$$PC_A(a_{1a})_y = PC_N(a_{1a})_y \quad (1a)$$

$$PC_A(a_{1b})_y = PC_N(a_{1b})_y \quad (1b)$$

$$PC_A(a_{1c})_y = PC_N(a_{1c})_y \quad (1c)$$

$$PC_A(a_{1d})_y = PC_N(a_{1d})_y \quad (1d)$$

where $PC_A(a_{1a})_y$ is the y-coordinate of $PC_A(ala)$, $PC_N(a_{1a})_y$ is the y-coordinate of nominal page center $PC_N(a_{1a})$, and so on.

Next, at step 90, the x-coordinates of actual page centers $PC_A(a_{1a})$-$PC_A(a_{1d})$ are determined based on the locations of selected binding edge 30$v_1$, the spine-binding edge separation $\Delta_s$, and actual page size $PS_A$. In this regard, the spine 56$_1$ of each actual page 24$a_1$' is aligned to the spine 56$_1$ of the corresponding nominal page 24$a_1$ to preserve spine-binding edge separation $\Delta_s$. Thus, the x-coordinates of actual page centers $PC_A(a_{1a})$-$PC_A(a_{1d})$ are determined as follows:

$$PC_A(a_{1a})_x = PC_A(a_{1c})_x = 30v_{1x} - \Delta_s - \frac{PS_A(\text{width})}{2} \quad (2a)$$

$$PC_A(a_{1b})_x = PC_A(a_{1d})_x = 30v_{1x} + \Delta_s + \frac{PS_A(\text{width})}{2} \quad (2b)$$

where 30$v_{1x}$ is the x-coordinate of binding edge 30$v_1$, and $PS_A(\text{width})$ is the width of actual page size $PS_A$. Thus, after completing step 90, the x- and y-coordinates of each actual page center $PC_A(a_{1a})$-$PC_A(a_{1d})$ are known. Next, at step 92, because layout description 50$a_1$ includes an additional binding edge 30$v_2$, the process returns to step 84 to process binding edge 30$v_2$.

Referring now to FIGS. 8A and 9B, an example of process steps 82-92 is described using exemplary layout description 50$a_2$. Beginning at step 82, binding edge 30$h$, which is surrounded by adjacent actual pages 24$a_{2a}$'-24$a_{2d}$', is selected. Next, at step 84, binding edge 30$h$ is identified as horizontal, and therefore the process proceeds to step 88, wherein for each actual page 24$a_{2a}$'-24$a_{2d}$', the x-coordinate of the actual page center $PC_A(a_{2a})$-$PC_A(a_{2d})$, respectively, is set to the x-coordinate of the corresponding nominal page center $PC_N$(a):

$$PC_A(a_{2a})_x = PC_N(a_{2a})_x \quad (3a)$$

$$PC_A(a_{2b})_x = PC_N(a_{2b})_x \quad (3b)$$

$$PC_A(a_{2c})_x = PC_N(a_{2c})_x \quad (3c)$$

$$PC_A(a_{2d})_x = PC_N(a_{2d})_x \quad (3d)$$

Next, at step 90, the y-coordinates of actual page centers $PC_A(a_{2a})$-$PC_A(a_{2d})$ are determined based on the locations of selected binding edge 30$h$, the spine-binding edge separation $\Delta_s$, and actual page size $PS_A$. In this regard, the spine 56$_2$ of each actual page 24$a_2$' is aligned to the spine 56$_2$ of each corresponding nominal page 24$a_2$ to preserve spine-binding edge separation $\Delta_s$. Thus, the y-coordinates of $PC_A(a_{2a})$ and $PC_A(a_{2b})$ are determined as follows:

$$PC_A(a_{2a})_y = PC_A(a_{2b})_y = 30h_y + \Delta_s + \frac{PS_A(\text{height})}{2} \quad (4a)$$

$$PC_A(a_{2c})_y = PC_A(a_{2d})_y = 30hy - \Delta_s - \frac{PS_A(\text{height})}{2} \quad (4b)$$

where 30$h_y$ is the y-coordinate of binding edge 30$h$, and $PS_A(\text{height})$ is the height of actual page size $PS_A$. Therefore, after completing step 90, the x- and y-coordinates of each actual page center $PC_A(a_{2a})$-$PC_A(a_{2d})$ are known. Next, at step 92, because layout description 50$a_2$ includes no more binding edges, the process terminates.

Figure 8B:
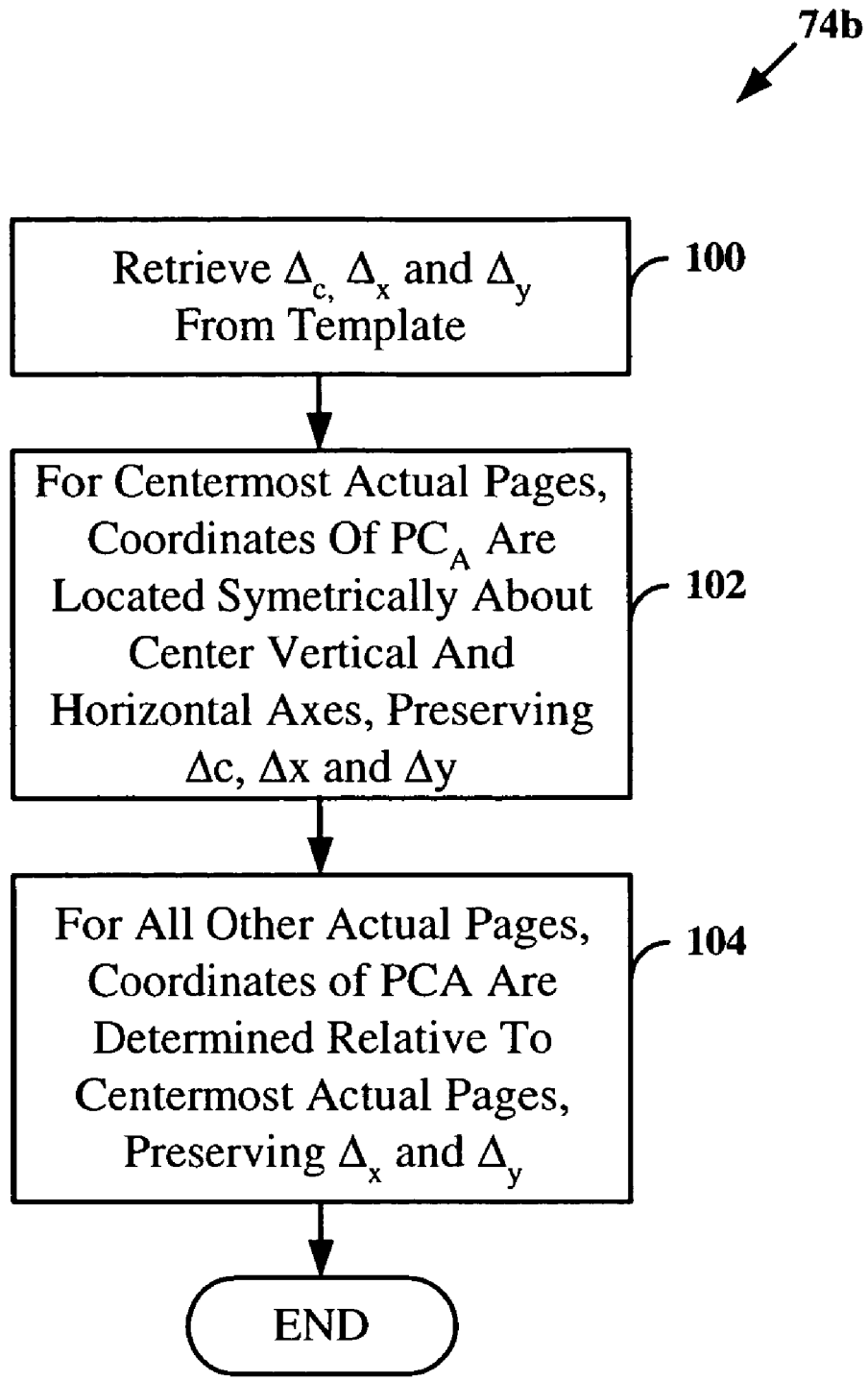
FIG. 8B is a flow diagram of an exemplary process for creating a modified imposition template in accordance with this invention for a non-book binding layout.

Referring now to FIGS. 8B and 10, an exemplary process 74$b$ is described for determining the location of each actual page center $PC_A$ for a nominal imposition template 46 that specifies a binding style other than book binding (e.g., gan-gup). In particular, FIGS. 10A-10D illustrate various exemplary layout descriptions 50$b_1$, 50$b_2$, 50$b_3$ and 50$b_4$ that include actual pages 24$b_2$'. For illustrative purposes, FIGS. 10A-10D also show corresponding nominal pages 24$b$. For clarity, however, bleed marks 28$a$, trim marks 28$b$ and nominal page centers $PC_N$ associated with pages 24$b$ are not shown.

Referring again to FIG. 8B, beginning at step 100, the center axis-page edge separation $\Delta_c$, the horizontal page separation $\Delta_x$, and the vertical page separation $\Delta_y$ are retrieved from nominal imposition template 46. Next, at step 102, for each actual page 24$b$' located in the centermost rows and columns, the x- and y-coordinates of the actual page center $PC_A(b)$ are set to values that are centered symmetrically about vertical and horizontal center axes 32$v$ and 32$h$, respectively, while preserving center axis-page edge separation $\Delta_c$, horizontal page separation $\Delta_x$ and vertical page separation $\Delta_y$. Next, at step 104, for all other actual pages 24$b$', the x- and y-coordinates of the each actual page center $PC_A(b)$ are determined relative to the centermost actual pages 24$b$', while preserving horizontal page separation $\Delta_x$ and vertical page separation $\Delta_y$.

Examples of the operation of steps 102-104 are now described using the exemplary layout descriptions 50$b_1$-50$b_4$ illustrated in FIGS. 10A-10D, respectively. In particular, referring now to FIGS. 8B and 10A, actual pages 24$b_{1a}$'-24$b_{1h}$' are all located in the centermost rows and columns of layout description 50$b_1$. Thus, at step 102, the x- and y-coordinates of actual page centers $PC_A(b_{1a})$-$PC_A(b_{1h})$, respectively, are set to values that are centered symmetrically about vertical and horizontal center axes 32$v$ and 32$h$, while preserving center axis-page edge separation $\Delta_c$, horizontal page separation $\Delta_x$ and vertical page separation $\Delta_y$, as follows:

$$PC_A(b_{1b})_x = PC_A(b_{1f})_x = 32v_x - \Delta c - \frac{PS_A(\text{width})}{2} \quad (5a)$$

$$PC_A(b_{1a})_x = PC_A(b_{1e})_x = 32v_x - \Delta c - \Delta x - \frac{3}{2}[PS_A(\text{width})] \quad (5b)$$

-continued $$PC_A(b_{1a})_y = \qquad (5c)$$
$$PC_A(b_{1b})_y = PC_A(b_{1c})_y = PC_A(b_{1d})_y = 32h_y + \frac{\Delta y}{2} + \frac{PS_A(\text{height})}{2}$$

$$PC_A(b_{1c})_x = PC_A(b_{1g})_x = 32v_x + \Delta c + \frac{PS_A(\text{width})}{2} \qquad (5d)$$

$$PC_A(b_{1d})_x = PC_A(b_{1h})_x = 32v_x + \Delta c + \Delta x + \frac{3}{2}[PS_A(\text{width})] \qquad (5e)$$

$$PC_A(b_{1e})_y = \qquad (5f)$$
$$PC_A(b_{1f})_y = PC_A(b_{1g})_y = PC_A(b_{1h})_y = 32h_y - \frac{\Delta y}{2} - \frac{PS_A(\text{height})}{2}$$

where $32v_x$ is the x-coordinate of vertical center axis $32v$, $32h_y$ is the y-coordinate of horizontal center axis $32h$, $PS_A$(width) is the width of actual page size $PS_A$, and $PS_A$(height) is the height of actual page size $PS_A$. Referring again to FIG. 8B, at step 104, because there are no remaining actual pages $24b_1'$, process 74b terminates.

Figure 10A:
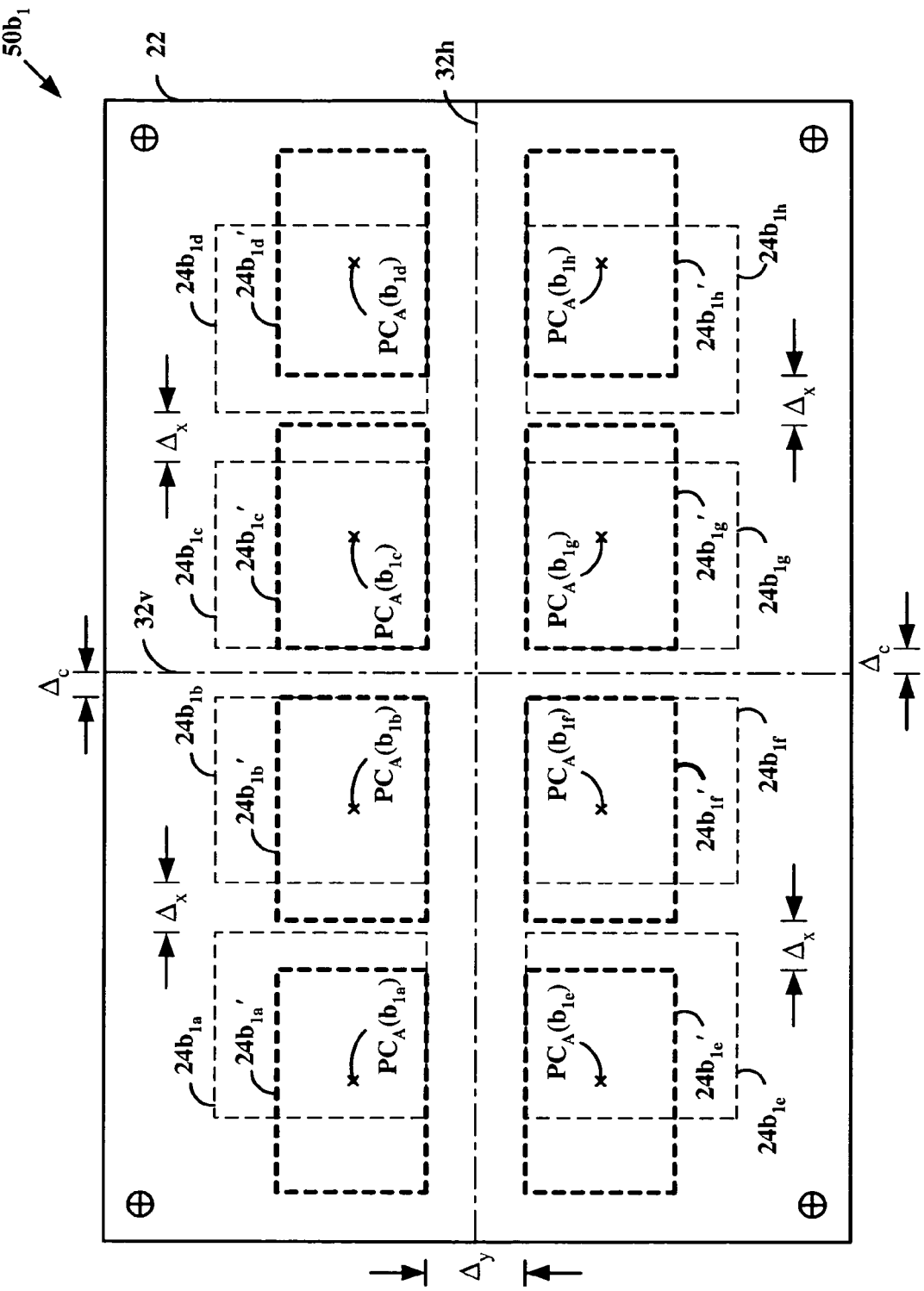
FIG. 10A is an exemplary imposition layout in accordance with this invention for a non-book binding template.
Figure 10B:
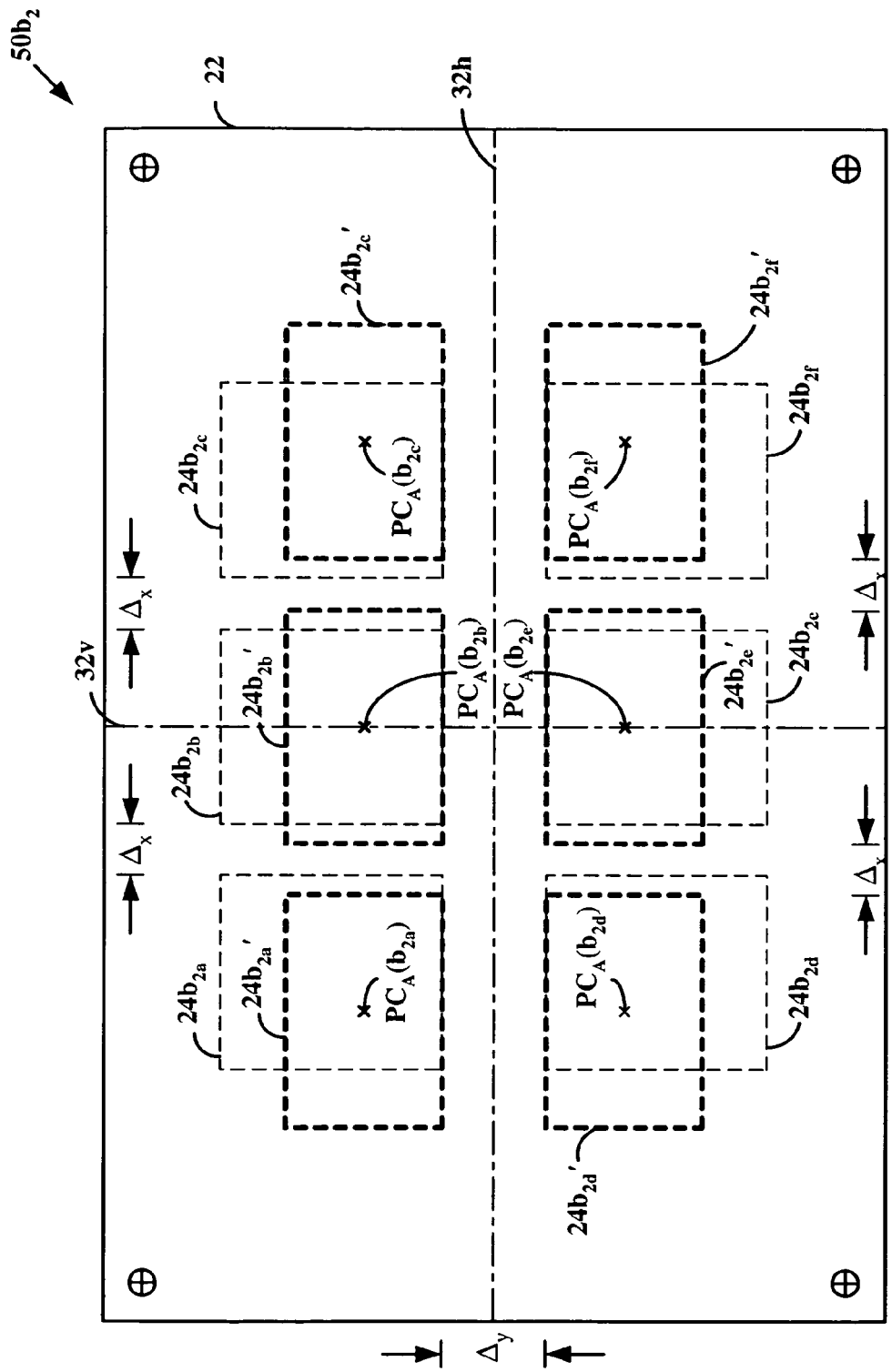
FIG. 10B is another exemplary imposition layout in accordance with this invention for a non-book binding template.

Referring now to FIGS. 8A and 10B, exemplary process steps 102-104 are described using the exemplary layout description $50b_2$, in which actual pages $24b_{2a}'$-$24b_{2f}'$ are all located in the centermost rows and columns. Thus, at step 102, the x- and y-coordinates of corresponding actual page centers $PC_A(b_{2a})$-$PC_A(b_{2f})$ are set to values that are centered symmetrically about vertical and horizontal center axes $32v$ and $32h$, while preserving center axis-page edge separation $\Delta_c$ (which is zero in this instance), horizontal page separation $\Delta_x$ and vertical page separation $\Delta_y$, as follows:

$$PC_A(b_{2a})_x = PC_A(b_{2d})_x = 32v_x - \Delta x - PS_A(\text{width}) \qquad (6a)$$

$$PC_A(b_{2a})_y = PC_a(b_{2b})_y = PC_A(b_{2c})_y = 32h_y + \frac{\Delta y}{2} + \frac{PS_A(\text{height})}{2} \qquad (6b)$$

$$PC_A(b_{2b})_x = PC_A(b_{2e})_x = 32v_x \qquad (6c)$$

$$PC_A(b_{2d})_y = PC_A(b_{2e})_y = PC_A(b_{2f})_y = 32h_y - \frac{\Delta y}{2} - \frac{PS_A(\text{height})}{2} \qquad (6d)$$

$$PC_A(b_{2c})_x = PC_A(b_{2f})_x = 32v_x + \Delta x + PS_A(\text{width}) \qquad (6e)$$

Referring again to FIG. 8B, at step 104, because there are no remaining actual pages $24b_2'$, process 74b terminates.

Figure 10C:
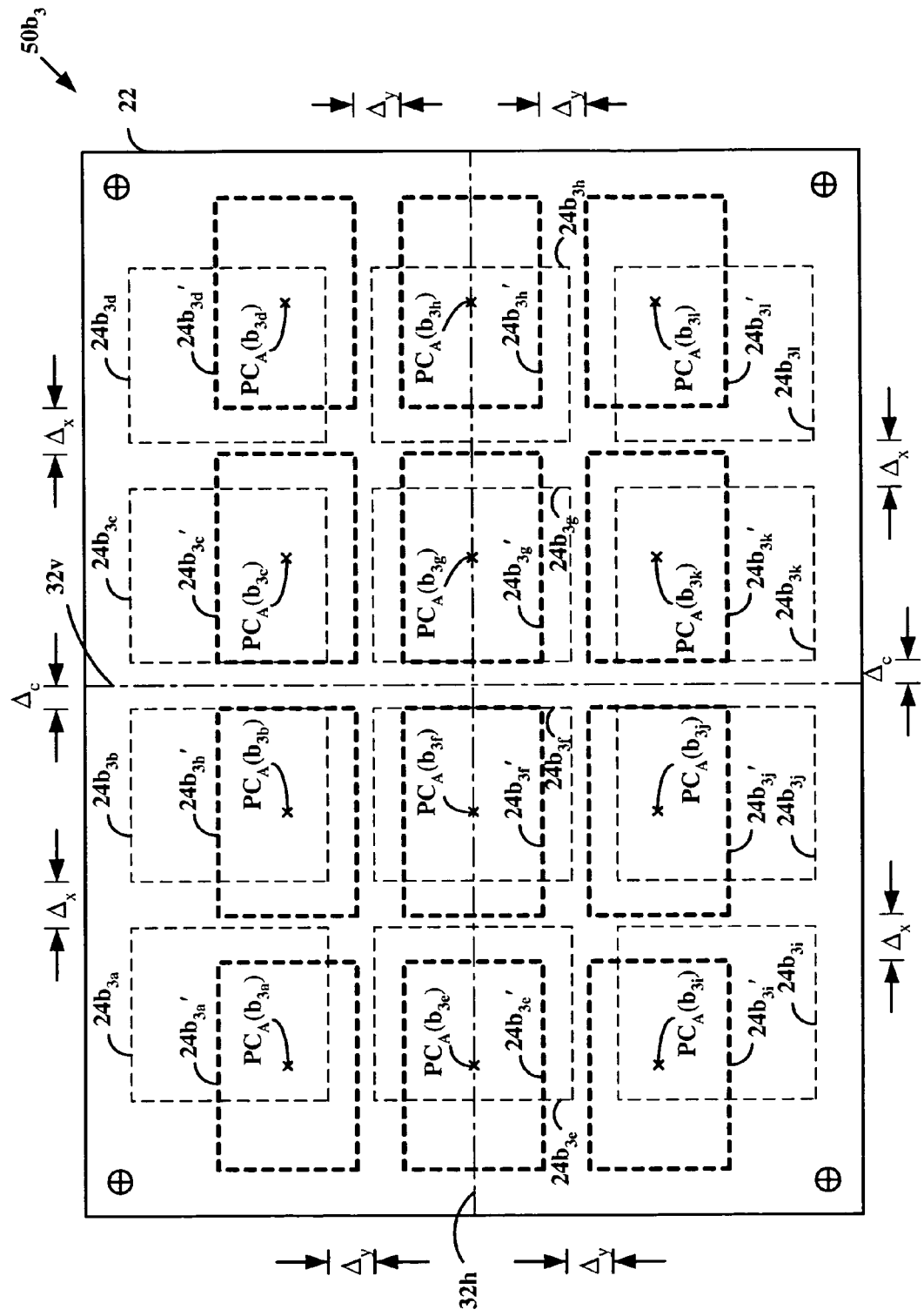
FIG. 10C is still another exemplary imposition layout in accordance with this invention for a non-book binding template.

Referring now to FIGS. 8B and 10C, exemplary process steps 102-104 are described using the exemplary layout description $50b_3$, in which actual pages $24b_{3b}'$, $24b_{3c}'$, $24b_{3e}'$, $24b_{3f}'$, $24b_{3g}'$, $24b_{3h}'$, $24b_{3j}'$ and $24b_{3k}'$ are all located in the centermost rows and columns. Thus, at step 102, the x- and y-coordinates of corresponding actual page centers $PC_A(b_{3b})$, $PC_A(b_3C)$, $PC_A(b_3e)$, $PC_A(b_{3f})$, $PC_A(b_{3g})$, $PC_A(b_{3h})$, $PC_A(b_{3j})$ and $PC_A(b_{3k})$ are set to values that are centered symmetrically about vertical and horizontal center axes $32v$ and $32h$, respectively, while preserving center axis-page edge separation $\Delta_c$, horizontal page separation $\Delta_x$ and vertical page separation $\Delta_y$, as follows:

$$PC_A(b_{3b})_x = PC_A(b_{3f})_x = PC_A(b_{3j})_x = 32v_x - \Delta c - \frac{PS_A(\text{width})}{2} \qquad (7a)$$

$$PC_A(b_{3b})_y = PC_A(b_{3c})_y = 32h_y + \Delta y + PS_A(\text{height}) \qquad (7b)$$

$$PC_A(b_{3c})_x = PC_A(b_{3g})_x = PC_A(b_{3k})_x = 32v_x + \Delta c + \frac{PS_A(\text{width})}{2} \qquad (7c)$$

$$PC_A(b_{3e})_y = PC_A(b_{3f})_y = PC_A(b_{3g})_y = PC_A(b_{3h}) = 32h_y \qquad (7d)$$

$$PC_A(b_{3e})x = 32v_x - \Delta c - \Delta x - \frac{3}{2}[PS_A(\text{width})] \qquad (7e)$$

$$PC_A(b_{3h})x = 32v_x + \Delta c + \Delta x + \frac{3}{2}[PS_A(\text{width})] \qquad (7f)$$

$$PC_A(b_{3j})_y = PC_A(b_{3k})y = 32h_y - \Delta y - PS_A(\text{height}) \qquad (7g)$$

Referring again to FIG. 8B, at step 104, for remaining actual pages $24b_{3a}'$, $24b_{3d}'$, $24b_{3i}'$ and $24b_{3l}'$, the x- and y-coordinates of corresponding actual page centers $PC_A(b_{3a})$, $PC_A(b_{3d})$, $PC_A(b_{3i})$ and $PC_A(b_{3l})$ are determined relative to centermost actual pages $24b_{3b}'$, $24b_{3c}'$, $24b_{3e}'$, $24b_{3f}'$, $24b_{3g}'$, $24b_{3h}'$, $24b_{3j}'$ and $24b_{3k}'$, while preserving horizontal page separation $\Delta_x$ and vertical page separation $\Delta_y$, as follows:

$$PC_A(b_{3a})_x = PC_A(b_{3i})_x = PC_A(b_{3b})_x - \Delta_x - PS_A(\text{width}) \qquad (8a)$$

$$PC_A(b_{3a})_y = PC_A(b_{3d})_y = PC_A(b_{3e})_y + \Delta_y + PS_A(\text{height}) \qquad (8b)$$

$$PC_A(b_{3d})_x = PC_A(b_{3l})_x = PC_A(b_{3c})_x \Delta_x PS_A(\text{width}) \qquad (8c)$$

$$PC_A(b_{3i})_y = PC_A(b_{3l})_y = PC_A(b_{3e})_y - \Delta_y - PS_A(\text{width}) \qquad (8d)$$

Process 74b then terminates.

Figure 10D:
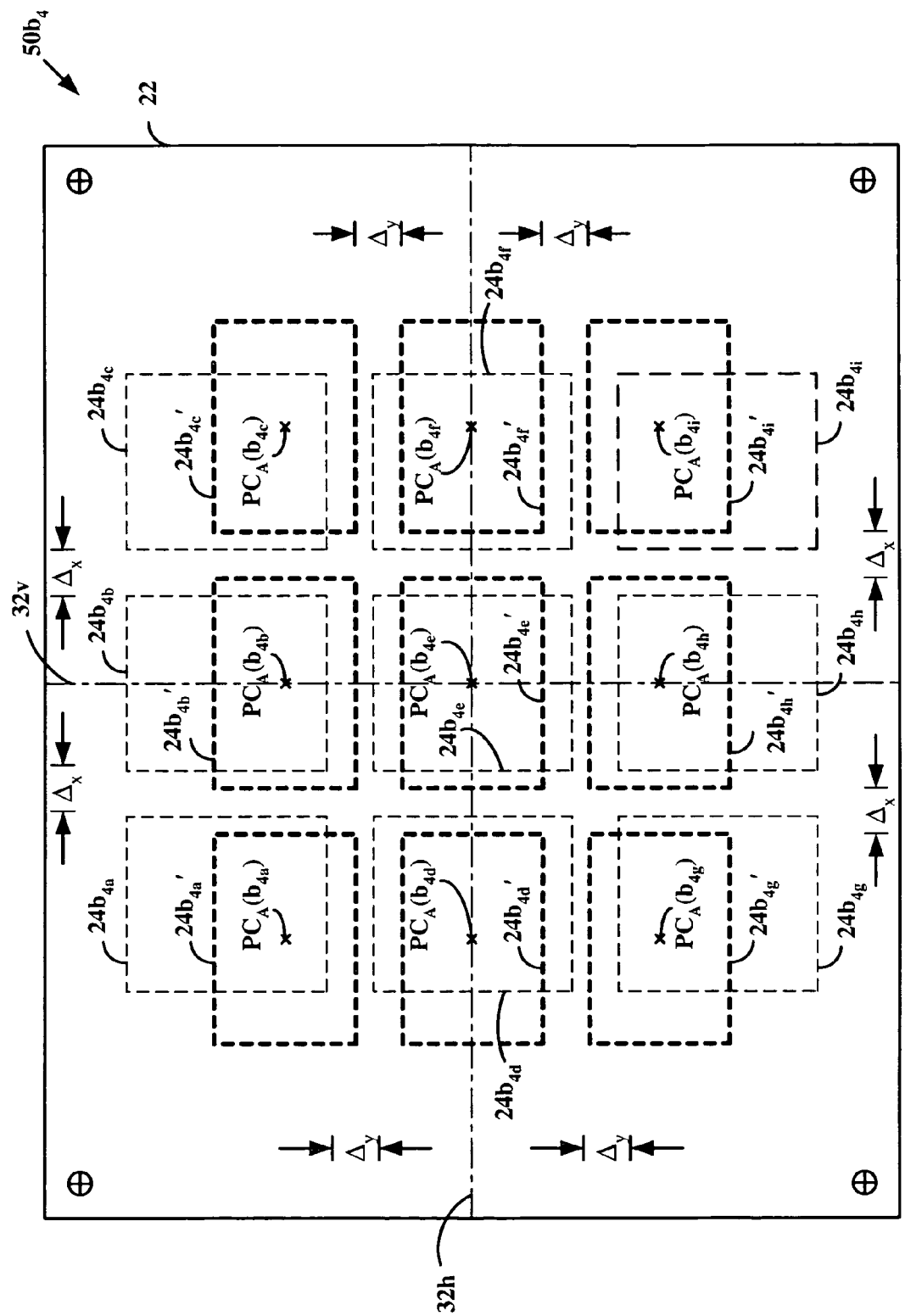
FIG. 10D is yet another exemplary imposition layout in accordance with this invention for a non-book binding template.

Referring now to FIGS. 8B and 10D, another example of process steps 102-104 will be described using the exemplary layout description $50b_4$, in which actual pages $24b_{4b}'$, $24b_{4d}'$, $24b_{4e}'$, $24b_{4f}'$ and $24b_{4h}'$ are all located in the centermost rows and columns. Thus, at step 102, the x- and y-coordinates of corresponding actual page centers $PC_A(b_{4b})$, $PC_A(b_{4d})$, $PC_A(b_{4e})$, $PC_A(b_{4f})$ and $PC_A(b_{4h})$ are set to values that are centered symmetrically about vertical and horizontal center axes $32v$ and $32h$, respectively, while preserving center axis-page edge separation $\Delta_c$ (which is zero in this instance), horizontal page separation $\Delta_x$ and vertical page separation $\Delta_y$, as follows:

$$PC_A(b_{4b})_x = PC_A(b_{4e})_x = PC_A(b_{4h})_x = 32v_x \qquad (9a)$$

$$PC_A(b_{4b})_y = 32h_y\Delta y + PS_A(\text{height}) \qquad (9b)$$

$$PC_A(b_{4d})_x = 32v_x - \Delta x - PS_A(\text{width}) \qquad (9c)$$

$$PC_A(b_{4d})_y = PC_A(b_{4e})_y = PC_A(b_{4f})_y = 32h_y \qquad (9d)$$

$$PC_A(b_{4f})_x = 32v_x + \Delta_x + PS_A(\text{width}) \qquad (9e)$$

$$PC_A(b_{4h})_y = 32h_y - \Delta_y - PS_A(\text{height}) \qquad (9f)$$

Next, at step 104, for remaining actual pages $24b_{4a}'$, $24b_{4c}'$, $24b_{4g}'$ and $24b_{4i}'$, the x- and y-coordinates of corresponding actual page centers $PC_A(b_{4a})$, $PC_A(b_{4c})$, $PC_A(b_{4g})$ and $PC_A(b_{4i})$ are determined relative to centermost actual pages $24b_{4b}'$, $24b_{4d}'$, $24b_{4h}'$, $24b_{4f}'$ and $24b_{4h}'$, while preserving horizontal page separation $\Delta_x$ and vertical page separation $\Delta_y$, as follows:

$$PC_A(b_{4a})_x = PC_A(b_{4g})_x = PC_A(b_{4b})_x - \Delta_x - PS_A(\text{width}) \qquad (10a)$$

$$PC_A(b_{4a})_y = PC_A(b_{4c})_y = PC_A(b_{4d})_y \Delta_y + PS_A(\text{height}) \qquad (10b)$$

$$PC_A(b_{4c})_x = PC_A(b_{4i})_x = PC_A(b_{4b})_x + \Delta_x + PS_A(\text{width}) \qquad (10c)$$

$$PC_A(b_{4g})_y = PC_A(b_{4i})_y = PC_A(bd)_y - \Delta_y - PS_A(\text{height}) \qquad (10d)$$

Process 74b then terminates.

Referring again to FIG. 7, at the completion of step 74, the location of the actual page center $PC_A$ of each actual page 24' has been determined. Next, at step 76, the locations of page-dependent marks 28' associated with each actual page 24' are determined based on the actual page size $PS_A$ and actual page center $PC_A$. Persons of ordinary skill in the art will understand that any suitable technique may be used to determine such locations. Finally, at step 78, nominal imposition template 46 is modified by locating actual pages 24' and associated page-dependent marks 28' at the locations determined in steps 74 and 76. In this regard, nominal pages 24 and associated page-dependent mark objects 28 may be deleted from nominal imposition template 46 and actual pages 24' and associated page-dependent marks 28' may be added to nominal imposition template 46, or nominal pages 24 and associated page-dependent mark objects 28 may be resized and repositioned as actual pages 24' and associated page-dependent marks 28'.

Figure 11A:
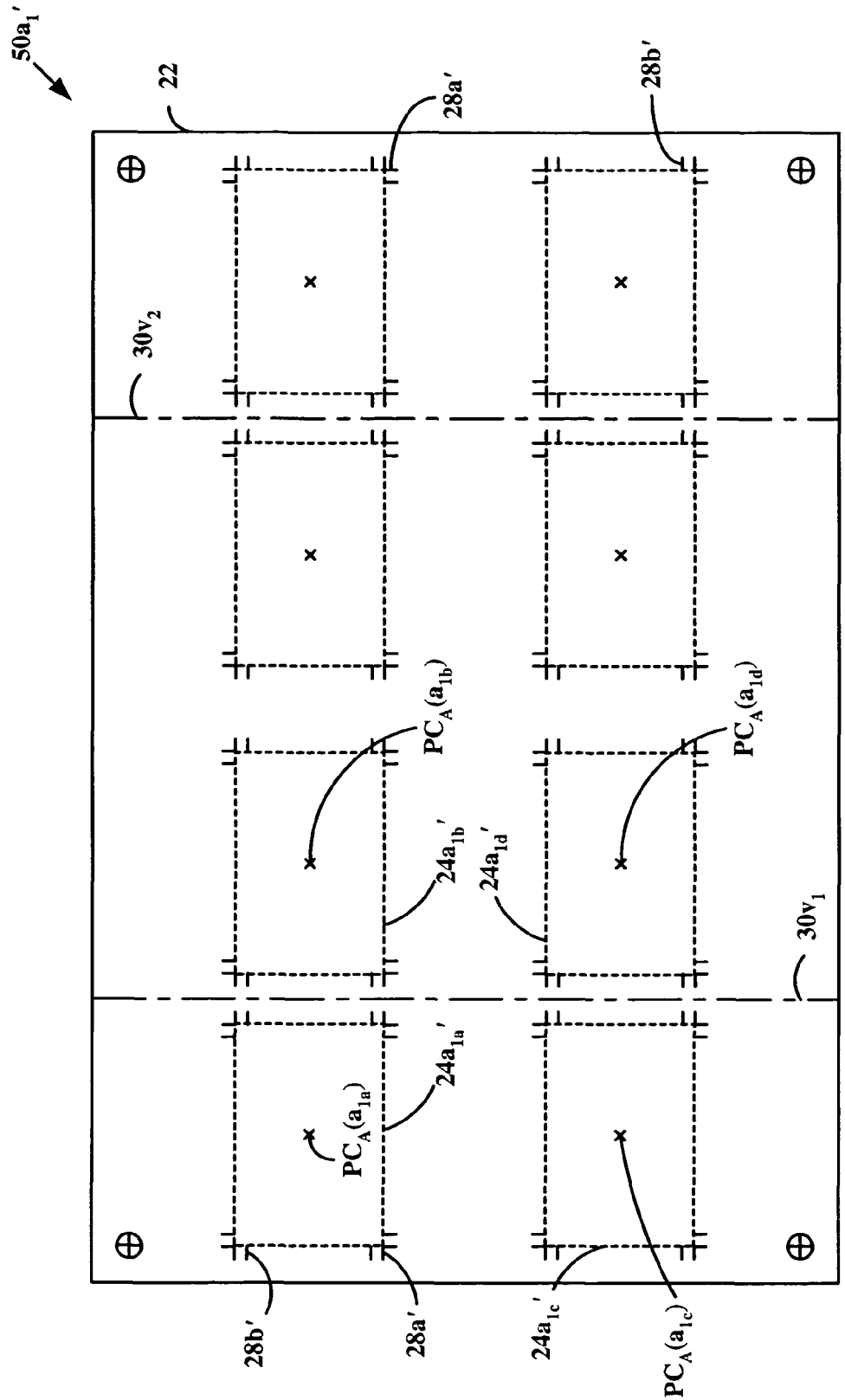
FIGS. 11A-11B are exemplary modified imposition layouts in accordance with this invention corresponding to the imposition layouts of FIGS. 9A-9B, respectively.
Figure 11B:
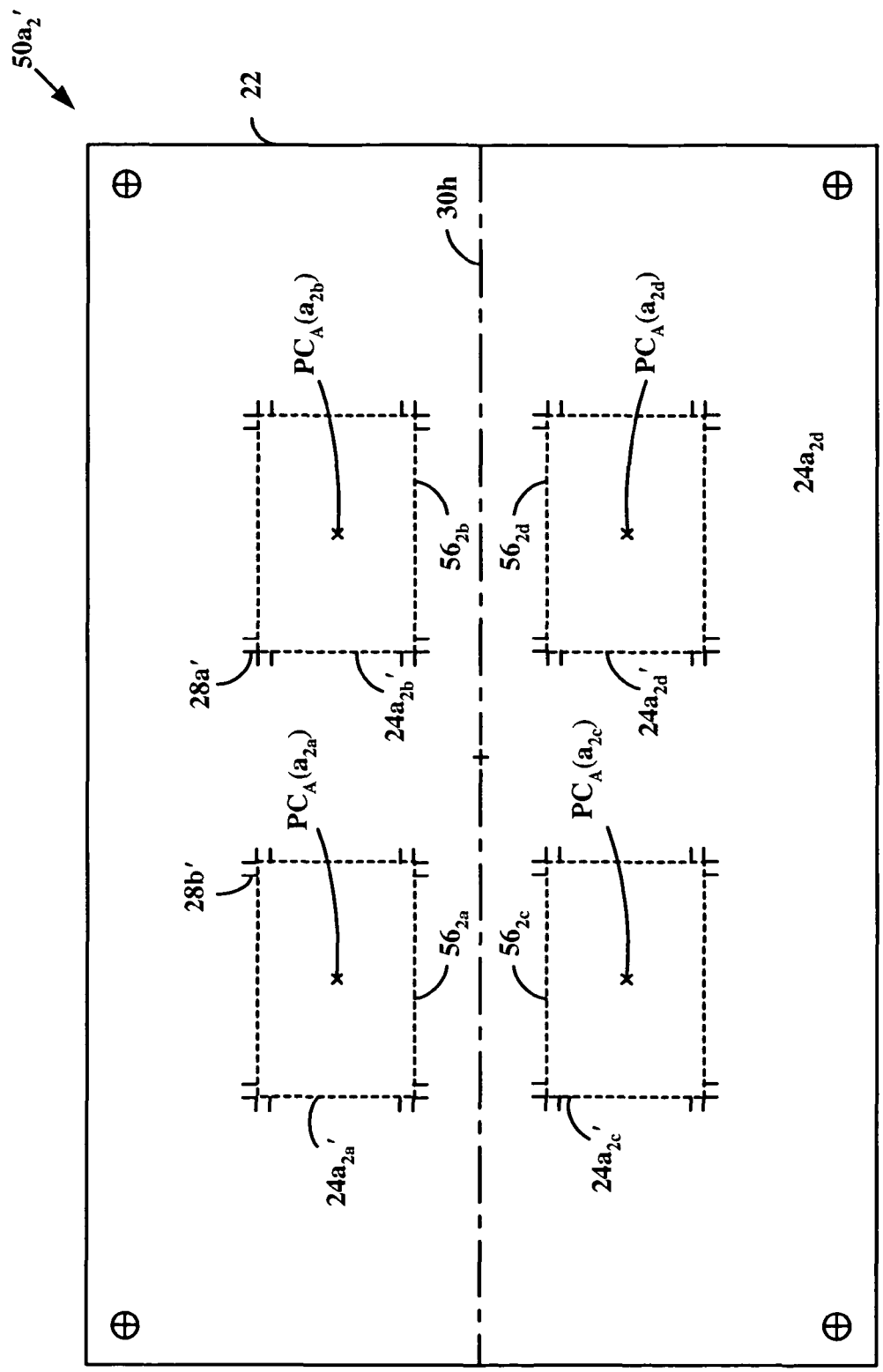
Figure 12A:
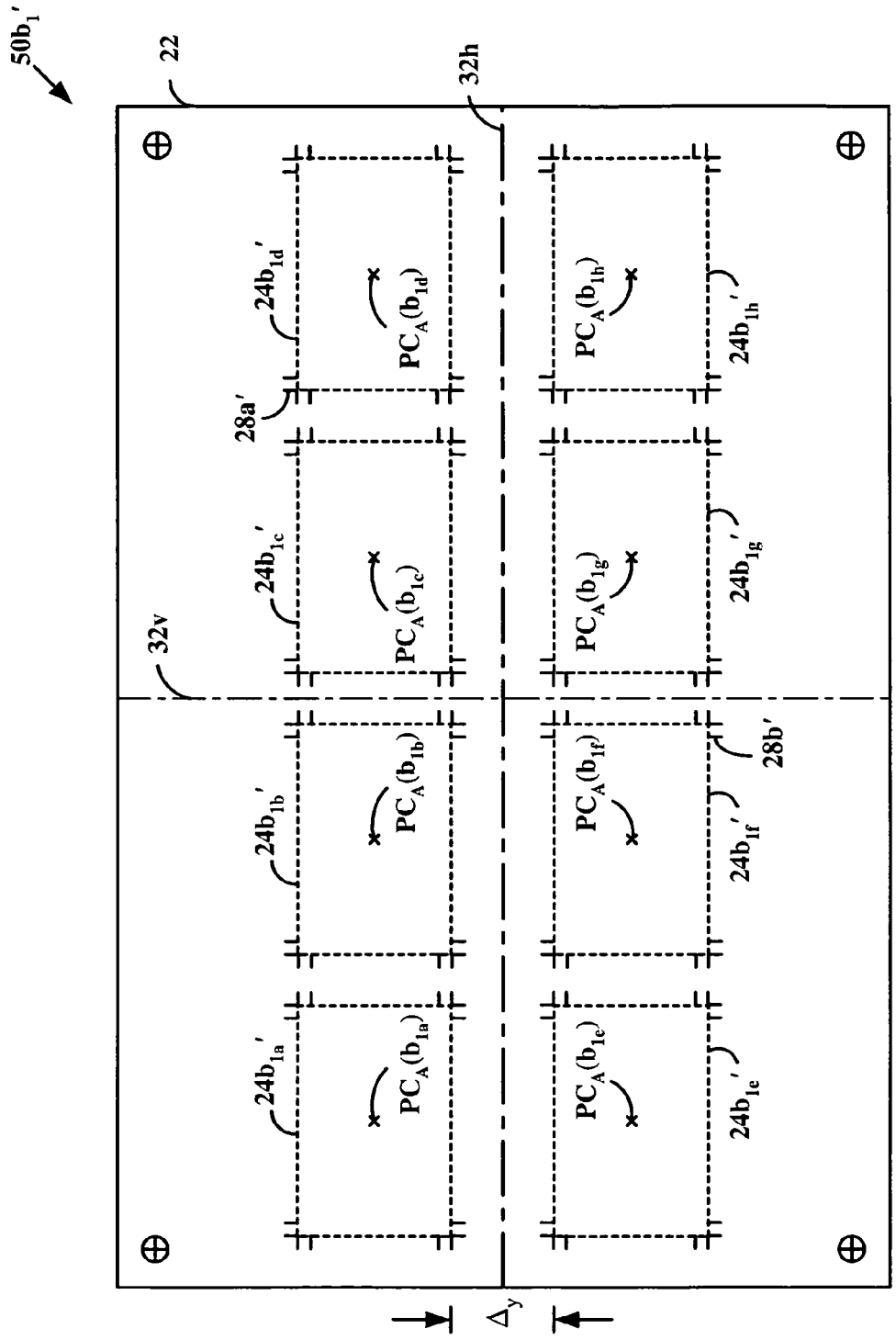
FIGS. 12A-12D are exemplary modified imposition layouts in accordance with this invention corresponding to the imposition layouts of FIGS. 10A-10D, respectively.
Figure 12B:
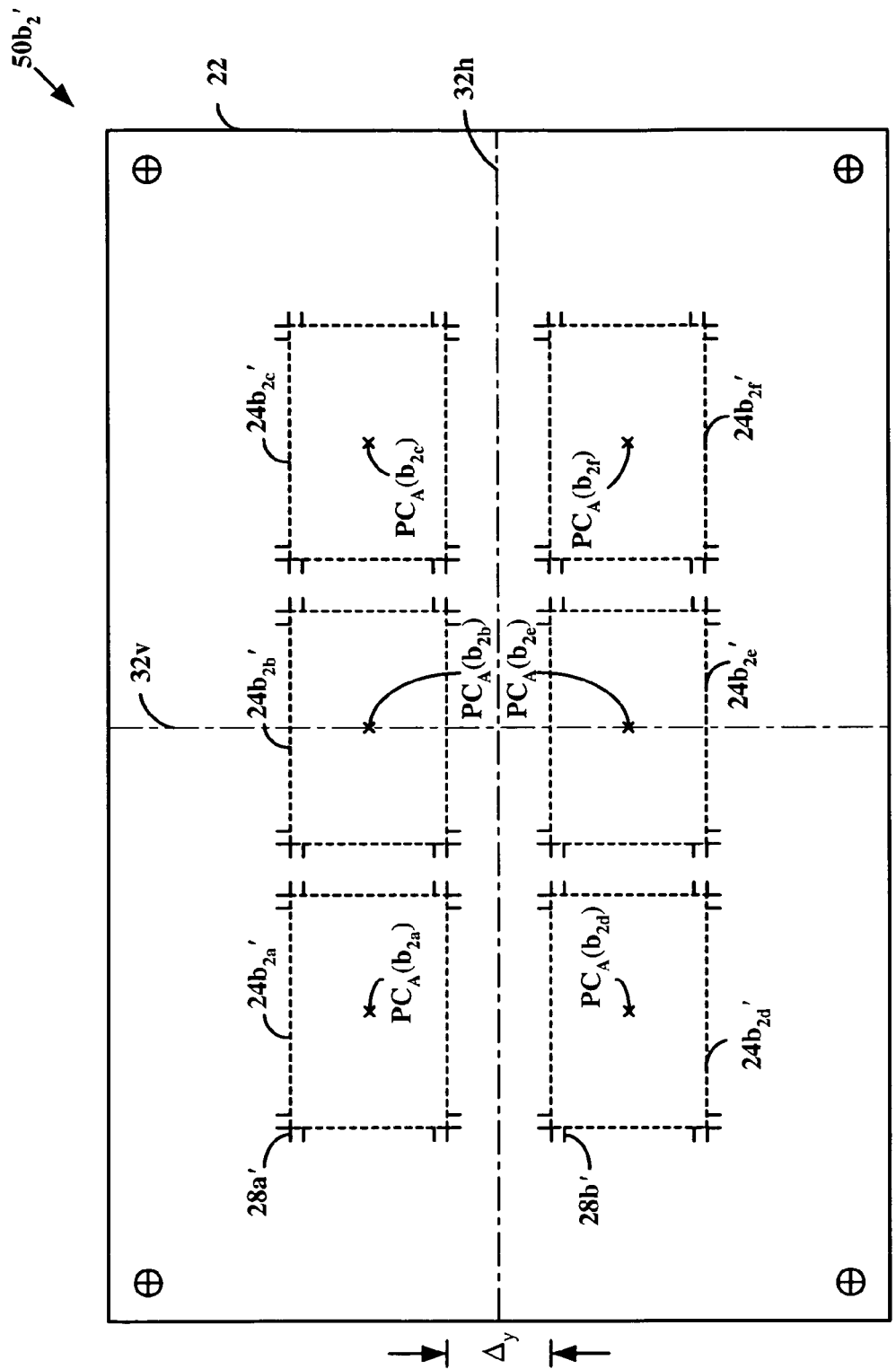
Figure 12C:
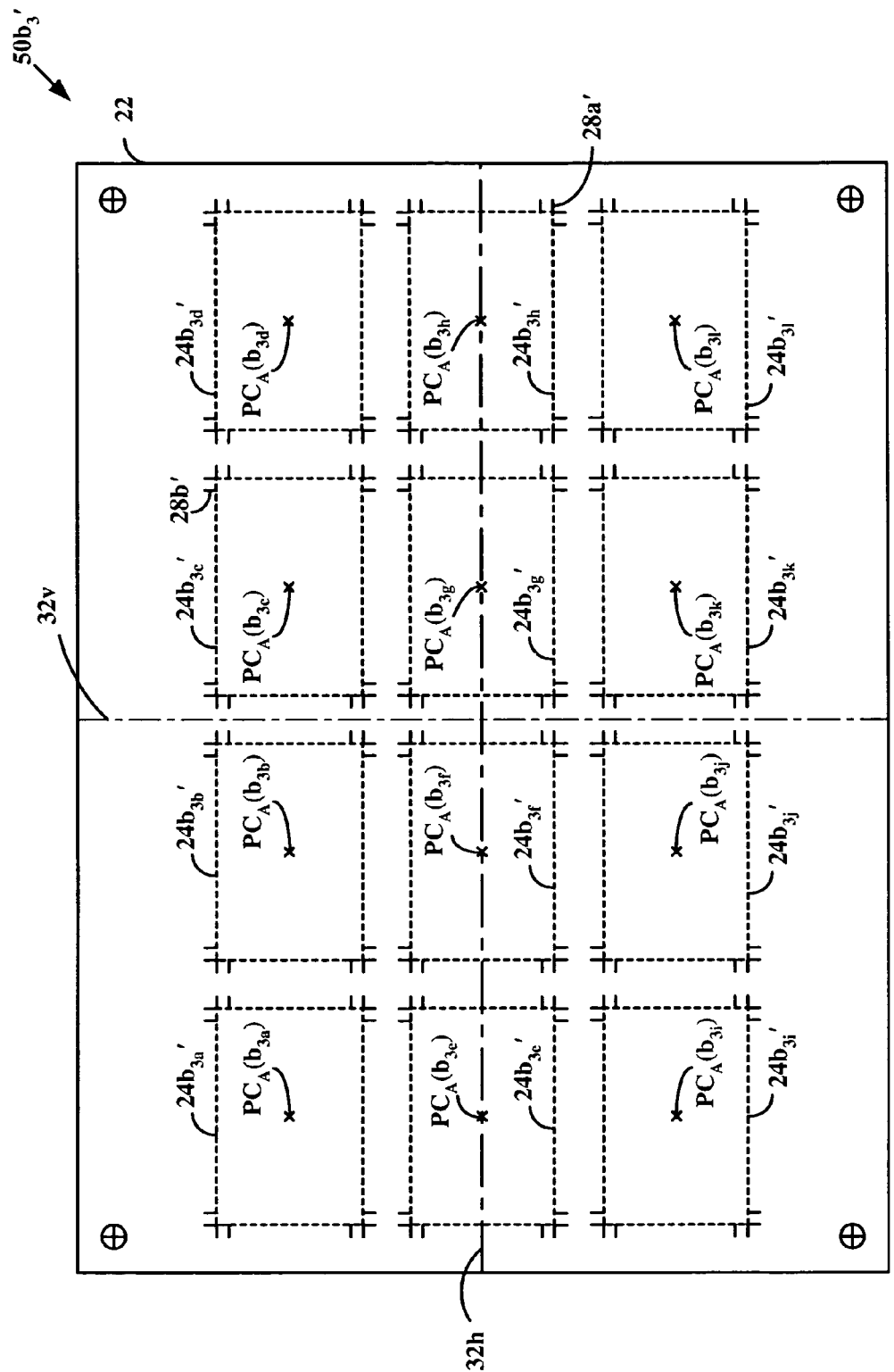
Figure 12D:
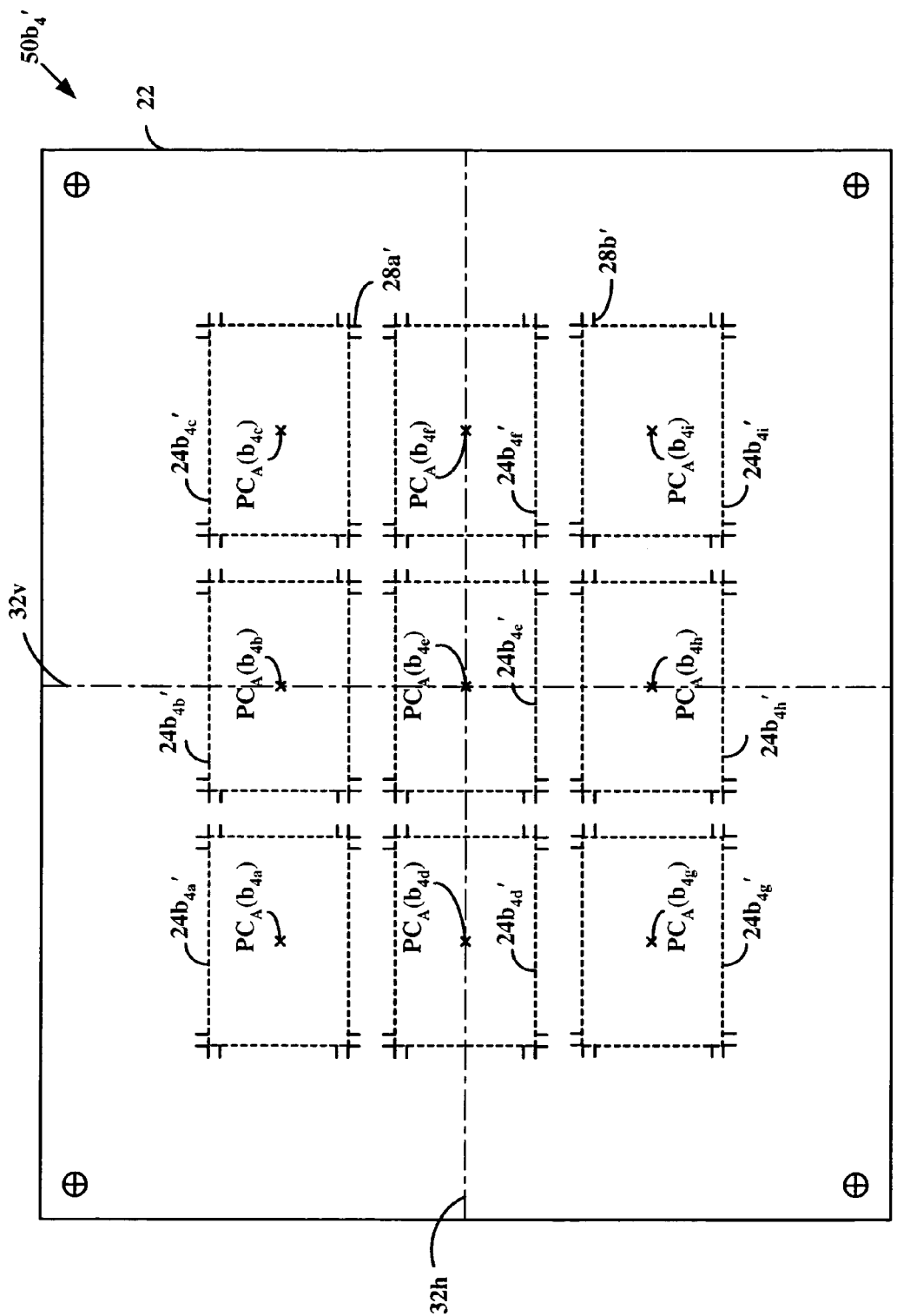

Exemplary modified imposition layouts $50a_1$' and $50a_2$' including actual pages $24a_{1a}$'-$24a_{1d}$' and $24a_{2a}$'-$24a_{2d}$', respectively, and their associated page-dependent mark objects 28', are illustrated in FIGS. 11A and 11B, respectively. Likewise, exemplary modified imposition layouts $50b_1$', $50b_2$', $50b_3$' and $50b_4$', including actual pages $24b_{1a}$'-$24b_{1h}$', $24b_{2a}$'-$24b_{2f}$', $24b_{3a}$'-$24b_{3f}$' and $24b_{4a}$'-$24b_{4i}$', respectively, and their associated page-dependent mark objects 28', are illustrated in FIGS. 12A-12D, respectively.

The foregoing merely illustrates the principles of this invention, and various modifications can be made by persons of ordinary skill in the art without departing from the scope and spirit of this invention.

The invention claimed is:

1. A system for processing a print file comprising an actual page size, the system comprising:
  a processor operatively coupled with memory;
  said processor configured for forming a nominal imposition template for imposing a plurality of pages in a plurality of nominal page positions having vertical coordinates, horizontal coordinates, a nominal page size, and nominal page centers, wherein at least two nominal page positions are separated by at least one horizontal center axis, and wherein at least two nominal page positions are separated by at least one vertical center axis;
  wherein the imposition template is adapted for use with imposition software for creating a modified imposition flat, wherein the imposition software uses actual page data from an incoming print file, said actual page data including:
    at least one center axis separation attribute,
    at least one vertical page separation attribute,
    vertical coordinates for each page,
    horizontal coordinates for each page, and
    actual page size, wherein the native size dimensions of the incoming print file are not known in advance;
  said processor further configured for executing an application adapted to receive the print file and the nominal imposition template, and further adapted to automatically modify the nominal imposition template if the actual page size differs from the nominal page size, forming a modified imposition template, wherein the automatic modification is performed without modifying the scale or proportion of the print file and without intervention from an operator, and wherein the application for automatically modifying the nominal imposition template further comprises:
    determining an actual page center of each page from the print file by performing the steps of:
      retrieving at least one center axis separation attribute from the nominal imposition template;
      retrieving at least one vertical page separation attribute from the nominal imposition template;
      selecting retrieving nominal page positions from the nominal imposition template;
      setting the axial actual page centers to the nominal page centers by symmetrically aligning the vertical coordinate with the nominal page positions and maintaining said at least one center axis separation attribute and said at least one vertical page separation attribute;
    determining the locations of an associated page-dependent object based on the location of the actual page center; and
    modifying the nominal imposition template based on the positions of the actual page centers and the location of the associated page-dependent object; and
    applying the modified imposition template to the print file to create a modified imposition flat,
  wherein the incoming print file automatically fits into the modified template in its native size proportions; and
  a printer for printing a print file in its native size proportions and fit into a modified template.

2. The system of claim 1, wherein the print file comprises a page description language.

3. The system of claim 2, wherein the page description language comprises at least one of a portable document format ("PDF"), a PostScript, or a printer command language ("PCL").

4. The system of claim 1, wherein the nominal imposition template further comprises a mark object having a location that depends on the nominal page size.

5. The system of claim 4, wherein the application is further adapted to modify the location of the mark object based on the actual page size.

6. The system of claim 4, wherein the mark object comprises a bleed mark.

7. The system of claim 4, wherein the mark object comprises a trim mark.

8. A method for processing a print file comprising an actual page size, the method comprising:
  providing a nominal imposition template for imposing a plurality of pages in a plurality of nominal page positions having vertical coordinates, horizontal coordinates, a nominal page size, and nominal page centers, wherein at least two nominal page positions are separated by at least one horizontal center axis, and wherein at least two nominal page positions are separated by at least one vertical center axis;
  wherein the imposition template is adapted for use with imposition software for creating a modified imposition flat, wherein the imposition software uses actual page data from an incoming print file, said actual page data including:
    at least one center axis separation attribute,
    at least one vertical page separation attribute,
    vertical coordinates for each page,
    horizontal coordinates for each page, and
    actual page size, wherein the native size dimensions of the incoming print file are not known in advance;
  providing an application adapted to automatically modify the nominal imposition template if the actual page size differs from the nominal page size, wherein the nominal imposition template includes a nominal page center, forming a modified imposition template, wherein the automatic modification is performed without modifying the scale or proportion of the print file and without intervention from an operator, and wherein the application for automatically modifying the nominal imposition template further comprises:
  determining an actual page center of each page from the print file by performing the steps of:
    retrieving at least one center axis separation attribute from the nominal imposition template;
    retrieving at least one vertical page separation attribute from the nominal imposition template;
    selecting retrieving nominal page positions from the nominal imposition template;
    setting the axial actual page centers to the nominal page centers by symmetrically aligning the vertical coordinate with the nominal page positions and maintaining said at least one center axis separation attribute and said at least one vertical page separation attribute;
  determining the locations of an associated page-dependent object based on the location of the actual page center; and
  modifying the nominal imposition template based on the positions of the actual page centers and the location of the associated page-dependent object; and
  applying the modified imposition template to the print file to create a modified imposition flat, wherein the incoming print file automatically fits into the modified template in its native size proportions; and
    printing a print file in its native size proportions and fit into a modified template.

9. The method of claim 8, wherein the print file comprises a page description language.

10. The method of claim 9, wherein the page description language comprises at least one of a portable document format ("PDF"), a PostScript, or a printer command language ("PCL").

11. The method of claim 8, wherein the nominal imposition template further comprises a plurality of pages, wherein each page comprises an associated page location reference.

12. The method of claim 8, wherein the nominal imposition template further comprises a mark object having a location that depends on the nominal page size.

13. The method of claim 12, wherein the application is further adapted to modify the location of the mark object based on the actual page size.

14. The method of claim 12, wherein the mark object comprises a bleed mark.

15. The method of claim 12, wherein the mark object comprises a trim mark.

16. An imposition process comprising:
  receiving a print file comprising at least one spine-binding separation attribute, one or more binding edge, and an actual page size from an incoming print file, wherein the native size dimensions of the incoming print file are not known in advance;
  receiving a nominal imposition template for imposing a plurality of pages in a plurality of nominal page positions having vertical coordinates, horizontal coordinates, a nominal page size, and nominal page centers, wherein at least two nominal page positions are separated by at least one horizontal center axis, and wherein at least two nominal page positions are separated by at least one vertical center axis;
  wherein the imposition template is adapted for use with imposition software for creating a modified imposition flat, wherein the imposition software uses actual page data, said actual page data including:
    at least one center axis separation attribute,
    at least one vertical page separation attribute,
    vertical coordinates for each page,
    horizontal coordinates for each page, and
    actual page size, wherein the native size dimensions of the incoming print file are not known in advance;
  automatically modifying the nominal imposition template based on the actual page size if the actual page size does not equal the nominal page size, wherein the automatic modification is performed without modifying the scale or proportion of the print file and without intervention from an operator, the step of automatically modifying further comprising
  determining an actual page center of each page from the print file by performing the steps of:
    retrieving at least one center axis separation attribute from the nominal imposition template;
    retrieving at least one vertical page separation attribute from the nominal imposition template;
    selecting retrieving nominal page positions from the nominal imposition template;
    setting the axial actual page centers to the nominal page centers by symmetrically aligning the vertical coordinate with the nominal page positions and maintaining said at least one center axis separation attribute and said at least one vertical page separation attribute;
  determining the locations of an associated page-dependent object based on the location of the actual page center;
  modifying the nominal imposition template based on the positions of the actual page centers and the location of the associated page-dependent object;
  applying the nominal imposition template to the print file to generate the imposition flat,
  wherein the incoming print file automatically fits into the modified template in its native size proportions; and
    printing a print file in its native size proportions and fit into a modified template.

17. The imposition process of claim 16, wherein the print file comprises a page description language.

18. The imposition process of claim 17, wherein the page description language comprises at least one of a portable document format ("PDF"), a PostScript, or a printer command language ("PCL").

19. The imposition process of claim 16, wherein the nominal imposition template further comprises a plurality of pages, wherein each page comprises an associated page location reference.

20. The imposition process of claim 19, wherein automatically modifying comprises automatically modifying each page location reference based on the actual page size.

21. The imposition process of claim 16, wherein the nominal imposition template further comprises a mark object having a location that depends on the nominal page size.

22. The imposition process of claim 21, wherein automatically modifying comprises automatically modifying the location of the mark object based on the actual page size.

23. The imposition process of claim 21, wherein the mark object comprises a bleed mark.

24. The imposition process of claim 21, wherein the mark object comprises a trim mark.

* * * * *